(12) United States Patent  (10) Patent No.: US 8,286,029 B2
Anderson et al.  (45) Date of Patent: Oct. 9, 2012

(54) SYSTEMS AND METHODS FOR MANAGING UNAVAILABLE STORAGE DEVICES

(75) Inventors: Robert J. Anderson, London (GB); Neal T. Fachan, Seattle, WA (US); Peter J. Godman, Seattle, WA (US); Justin M. Husted, Seattle, WA (US); Aaron J. Passey, Seattle, WA (US); David W. Richards, Seattle, WA (US); Darren P. Schack, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 419 days.

(21) Appl. No.: 11/643,725

(22) Filed: Dec. 21, 2006

(65) Prior Publication Data

US 2008/0151724 A1 Jun. 26, 2008

(51) Int. Cl.
*G06F 11/00* (2006.01)
*G06F 11/20* (2006.01)

(52) U.S. Cl. ......... 714/6.32; 714/6.1; 714/6.24; 714/6.2
(58) Field of Classification Search ................. 714/1–7, 714/15, 6.3, 6.32, 6.1, 6.2, 6.22, 6.24
See application file for complete search history.

(56) References Cited

U.S. PATENT DOCUMENTS

| | | | |
|---|---|---|---|
| 4,608,688 A * | 8/1986 | Hansen et al. | 714/6.2 |
| 4,780,796 A | 10/1988 | Fukuda et al. | |
| 5,163,131 A | 11/1992 | Row et al. | |
| 5,181,162 A | 1/1993 | Smith et al. | |
| 5,212,784 A | 5/1993 | Sparks | |
| 5,230,047 A | 7/1993 | Frey et al. | |
| 5,251,206 A | 10/1993 | Calvignac et al. | |
| 5,258,984 A | 11/1993 | Menon et al. | |
| 5,329,626 A | 7/1994 | Klein et al. | |
| 5,359,594 A | 10/1994 | Gould et al. | |
| 5,403,639 A | 4/1995 | Belsan et al. | |
| 5,423,046 A | 6/1995 | Nunnelley et al. | |
| 5,459,871 A | 10/1995 | Van Den Berg | |
| 5,481,699 A | 1/1996 | Saether | |
| 5,548,724 A | 8/1996 | Akizawa et al. | |
| 5,548,795 A | 8/1996 | Au | |
| 5,568,629 A | 10/1996 | Gentry et al. | |
| 5,596,709 A | 1/1997 | Bond et al. | |
| 5,606,669 A | 2/1997 | Bertin et al. | |
| 5,612,865 A | 3/1997 | Dasgupta | |
| 5,649,200 A | 7/1997 | Leblang et al. | |
| 5,657,439 A | 8/1997 | Jones et al. | |
| 5,668,943 A | 9/1997 | Attanasio et al. | |

(Continued)

FOREIGN PATENT DOCUMENTS

EP 0774723 5/1997

(Continued)

OTHER PUBLICATIONS

Feb. 22, 2008 International Search Report; PCT/US07/018326.

(Continued)

*Primary Examiner* — Joseph Schell
(74) *Attorney, Agent, or Firm* — Knobbe, Martens, Olson & Bear, LLP

(57) ABSTRACT

In some embodiments, storage devices, such as a storage drive or a storage node, in an array of storage devices may be reintroduced into the array of storage devices after a period of temporary unavailability without fully rebuilding the entire previously unavailable storage device.

17 Claims, 14 Drawing Sheets

U.S. PATENT DOCUMENTS

| | | | |
|---|---|---|---|
| 5,680,621 A | 10/1997 | Korenshtein | |
| 5,694,593 A | 12/1997 | Baclawski | |
| 5,696,895 A | 12/1997 | Hemphill et al. | |
| 5,734,826 A | 3/1998 | Olnowich et al. | |
| 5,754,756 A | 5/1998 | Watanabe et al. | |
| 5,761,659 A | 6/1998 | Bertoni | |
| 5,774,643 A | 6/1998 | Lubbers et al. | |
| 5,799,305 A | 8/1998 | Bortvedt et al. | |
| 5,805,578 A | 9/1998 | Stirpe et al. | |
| 5,805,900 A | 9/1998 | Fagen et al. | |
| 5,806,065 A | 9/1998 | Lomet | |
| 5,822,790 A | 10/1998 | Mehrotra | |
| 5,832,200 A * | 11/1998 | Yoda | 714/6.24 |
| 5,862,312 A | 1/1999 | Mann | |
| 5,870,563 A | 2/1999 | Roper et al. | |
| 5,878,410 A | 3/1999 | Zbikowski et al. | |
| 5,878,414 A | 3/1999 | Hsiao et al. | |
| 5,884,046 A | 3/1999 | Antonov | |
| 5,884,098 A | 3/1999 | Mason, Jr. | |
| 5,884,303 A | 3/1999 | Brown | |
| 5,890,147 A | 3/1999 | Peltonen et al. | |
| 5,917,998 A * | 6/1999 | Cabrera et al. | 714/6 |
| 5,933,834 A | 8/1999 | Aichelen | |
| 5,943,690 A | 8/1999 | Dorricott et al. | |
| 5,963,963 A | 10/1999 | Schmuck et al. | |
| 5,966,707 A | 10/1999 | Van Huben et al. | |
| 5,983,232 A | 11/1999 | Zhang | |
| 5,996,089 A | 11/1999 | Mann | |
| 6,000,007 A | 12/1999 | Leung et al. | |
| 6,014,669 A | 1/2000 | Slaughter et al. | |
| 6,021,414 A | 2/2000 | Fuller | |
| 6,029,168 A | 2/2000 | Frey | |
| 6,038,570 A | 3/2000 | Hitz et al. | |
| 6,044,367 A | 3/2000 | Wolff | |
| 6,052,759 A | 4/2000 | Stallmo et al. | |
| 6,055,543 A | 4/2000 | Christensen et al. | |
| 6,055,564 A | 4/2000 | Phaal | |
| 6,070,172 A | 5/2000 | Lowe | |
| 6,081,833 A | 6/2000 | Okamoto et al. | |
| 6,081,883 A | 6/2000 | Popelka et al. | |
| 6,108,759 A | 8/2000 | Orcutt et al. | |
| 6,117,181 A | 9/2000 | Dearth et al. | |
| 6,122,754 A | 9/2000 | Litwin et al. | |
| 6,136,176 A | 10/2000 | Wheeler et al. | |
| 6,138,126 A | 10/2000 | Hitz et al. | |
| 6,154,854 A | 11/2000 | Stallmo | |
| 6,169,972 B1 | 1/2001 | Kono et al. | |
| 6,173,374 B1 | 1/2001 | Heil et al. | |
| 6,202,085 B1 | 3/2001 | Benson et al. | |
| 6,209,059 B1 | 3/2001 | Ofer et al. | |
| 6,219,693 B1 | 4/2001 | Napolitano et al. | |
| 6,226,377 B1 | 5/2001 | Donaghue, Jr. | |
| 6,247,108 B1 | 6/2001 | Long | |
| 6,279,007 B1 | 8/2001 | Uppala | |
| 6,321,345 B1 | 11/2001 | Mann | |
| 6,334,168 B1 | 12/2001 | Islam et al. | |
| 6,334,966 B1 | 1/2002 | Hahn et al. | |
| 6,353,823 B1 | 3/2002 | Kumar | |
| 6,384,626 B2 | 5/2002 | Tsai et al. | |
| 6,385,626 B1 | 5/2002 | Tamer et al. | |
| 6,393,483 B1 | 5/2002 | Latif et al. | |
| 6,397,311 B1 | 5/2002 | Capps | |
| 6,405,219 B2 | 6/2002 | Saether et al. | |
| 6,408,313 B1 | 6/2002 | Campbell et al. | |
| 6,415,259 B1 | 7/2002 | Wolfinger et al. | |
| 6,421,781 B1 | 7/2002 | Fox et al. | |
| 6,434,574 B1 | 8/2002 | Day et al. | |
| 6,449,730 B2 | 9/2002 | Mann | |
| 6,453,389 B1 | 9/2002 | Weinberger et al. | |
| 6,457,139 B1 | 9/2002 | D'Errico et al. | |
| 6,463,442 B1 | 10/2002 | Bent et al. | |
| 6,496,842 B1 | 12/2002 | Lyness | |
| 6,499,091 B1 | 12/2002 | Bergsten | |
| 6,502,172 B2 | 12/2002 | Chang | |
| 6,502,174 B1 | 12/2002 | Beardsley et al. | |
| 6,523,130 B1 | 2/2003 | Hickman et al. | |
| 6,526,478 B1 | 2/2003 | Kirby | |
| 6,546,443 B1 | 4/2003 | Kakivaya et al. | |
| 6,549,513 B1 | 4/2003 | Chao et al. | |
| 6,557,114 B2 | 4/2003 | Mann | |
| 6,567,894 B1 | 5/2003 | Hsu et al. | |
| 6,567,926 B2 | 5/2003 | Mann | |
| 6,571,244 B1 | 5/2003 | Larson | |
| 6,571,349 B1 | 5/2003 | Mann | |
| 6,574,745 B2 | 6/2003 | Mann | |
| 6,594,655 B2 | 7/2003 | Tal et al. | |
| 6,594,660 B1 | 7/2003 | Berkowitz et al. | |
| 6,594,744 B1 | 7/2003 | Humlicek et al. | |
| 6,598,174 B1 | 7/2003 | Parks et al. | |
| 6,618,798 B1 | 9/2003 | Burton et al. | |
| 6,631,411 B1 | 10/2003 | Welter et al. | |
| 6,658,554 B1 | 12/2003 | Moshovos et al. | |
| 6,662,184 B1 | 12/2003 | Friedberg | |
| 6,668,304 B1 | 12/2003 | Satran et al. | |
| 6,671,686 B2 | 12/2003 | Pardon et al. | |
| 6,671,704 B1 | 12/2003 | Gondi et al. | |
| 6,671,772 B1 | 12/2003 | Cousins | |
| 6,687,805 B1 | 2/2004 | Cochran | |
| 6,725,392 B1 * | 4/2004 | Frey et al. | 714/6.12 |
| 6,732,125 B1 | 5/2004 | Autrey et al. | |
| 6,742,020 B1 | 5/2004 | Dimitroff et al. | |
| 6,748,429 B1 | 6/2004 | Talluri et al. | |
| 6,801,949 B1 | 10/2004 | Bruck et al. | |
| 6,848,029 B2 | 1/2005 | Coldewey | |
| 6,856,591 B1 | 2/2005 | Ma et al. | |
| 6,871,295 B2 | 3/2005 | Ulrich et al. | |
| 6,895,482 B1 | 5/2005 | Blackmon et al. | |
| 6,895,534 B2 | 5/2005 | Wong et al. | |
| 6,907,011 B1 | 6/2005 | Miller et al. | |
| 6,907,520 B2 | 6/2005 | Parady | |
| 6,917,942 B1 | 7/2005 | Burns et al. | |
| 6,920,494 B2 | 7/2005 | Heitman et al. | |
| 6,922,696 B1 | 7/2005 | Lincoln et al. | |
| 6,922,708 B1 | 7/2005 | Sedlar | |
| 6,934,878 B2 | 8/2005 | Massa et al. | |
| 6,940,966 B2 | 9/2005 | Lee | |
| 6,954,435 B2 | 10/2005 | Billhartz et al. | |
| 6,990,604 B2 | 1/2006 | Binger | |
| 6,990,611 B2 * | 1/2006 | Busser | 714/42 |
| 7,007,044 B1 | 2/2006 | Rafert et al. | |
| 7,007,097 B1 | 2/2006 | Huffman et al. | |
| 7,010,622 B1 | 3/2006 | Bauer et al. | |
| 7,017,003 B2 | 3/2006 | Murotani et al. | |
| 7,043,485 B2 | 5/2006 | Manley et al. | |
| 7,043,567 B2 | 5/2006 | Trantham | |
| 7,058,639 B1 | 6/2006 | Chatterjee et al. | |
| 7,069,320 B1 | 6/2006 | Chang et al. | |
| 7,103,597 B2 | 9/2006 | McGoveran | |
| 7,111,305 B2 | 9/2006 | Solter et al. | |
| 7,113,938 B2 | 9/2006 | Highleyman et al. | |
| 7,124,264 B2 * | 10/2006 | Yamashita | 711/162 |
| 7,146,524 B2 | 12/2006 | Patel et al. | |
| 7,152,182 B2 | 12/2006 | Ji et al. | |
| 7,165,192 B1 | 1/2007 | Cadieux et al. | |
| 7,177,295 B1 | 2/2007 | Sholander et al. | |
| 7,181,746 B2 | 2/2007 | Perycz et al. | |
| 7,184,421 B1 | 2/2007 | Liu et al. | |
| 7,194,487 B1 | 3/2007 | Kekre et al. | |
| 7,206,805 B1 | 4/2007 | McLaughlin, Jr. | |
| 7,225,204 B2 | 5/2007 | Manley et al. | |
| 7,228,299 B1 | 6/2007 | Harmer et al. | |
| 7,240,235 B2 | 7/2007 | Lewalski-Brechter | |
| 7,249,118 B2 | 7/2007 | Sandler et al. | |
| 7,257,257 B2 | 8/2007 | Anderson et al. | |
| 7,290,056 B1 | 10/2007 | McLaughlin, Jr. | |
| 7,313,614 B2 | 12/2007 | Considine et al. | |
| 7,318,134 B1 | 1/2008 | Oliveira et al. | |
| 7,346,346 B2 | 3/2008 | Fachan | |
| 7,346,720 B2 | 3/2008 | Fachan | |
| 7,370,064 B2 | 5/2008 | Yousefi'zadeh | |
| 7,373,426 B2 | 5/2008 | Jinmei et al. | |
| 7,386,610 B1 | 6/2008 | Vekiarides | |
| 7,386,675 B2 | 6/2008 | Fachan | |
| 7,386,697 B1 | 6/2008 | Case et al. | |
| 7,389,379 B1 * | 6/2008 | Goel et al. | 711/112 |
| 7,440,966 B2 | 10/2008 | Adkins et al. | |
| 7,451,341 B2 * | 11/2008 | Okaki et al. | 714/4 |

| | | | |
|---|---|---|---|
| 7,502,801 B2 | 3/2009 | Sawdon et al. | |
| 7,509,448 B2 | 3/2009 | Fachan et al. | |
| 7,509,524 B2 | 3/2009 | Patel et al. | |
| 7,533,298 B2 | 5/2009 | Smith et al. | |
| 7,536,588 B2 * | 5/2009 | Hafner et al. | 714/6.22 |
| 7,546,354 B1 * | 6/2009 | Fan et al. | 709/219 |
| 7,546,412 B2 * | 6/2009 | Ahmad et al. | 711/112 |
| 7,551,572 B2 | 6/2009 | Passey et al. | |
| 7,558,910 B2 | 7/2009 | Alverson et al. | |
| 7,571,348 B2 * | 8/2009 | Deguchi et al. | 714/15 |
| 7,577,258 B2 | 8/2009 | Wiseman et al. | |
| 7,577,667 B2 | 8/2009 | Hinshaw et al. | |
| 7,590,652 B2 | 9/2009 | Passey et al. | |
| 7,593,938 B2 | 9/2009 | Lemar et al. | |
| 7,617,289 B2 | 11/2009 | Srinivasan et al. | |
| 7,631,066 B1 | 12/2009 | Schatz et al. | |
| 7,639,818 B2 | 12/2009 | Fujimoto et al. | |
| 7,665,123 B1 | 2/2010 | Szor et al. | |
| 7,665,136 B1 | 2/2010 | Szor et al. | |
| 7,676,691 B2 * | 3/2010 | Fachan et al. | 714/15 |
| 7,680,836 B2 | 3/2010 | Anderson et al. | |
| 7,680,842 B2 | 3/2010 | Anderson et al. | |
| 7,685,126 B2 | 3/2010 | Patel et al. | |
| 7,685,162 B2 | 3/2010 | Heider et al. | |
| 7,689,597 B1 | 3/2010 | Bingham et al. | |
| 7,707,193 B2 | 4/2010 | Zayas et al. | |
| 7,716,262 B2 | 5/2010 | Pallapotu | |
| 7,734,603 B1 | 6/2010 | McManis | |
| 7,739,288 B2 | 6/2010 | Lemar et al. | |
| 7,743,033 B2 | 6/2010 | Patel et al. | |
| 7,752,226 B1 | 7/2010 | Harmer et al. | |
| 7,752,402 B2 | 7/2010 | Fachan et al. | |
| 7,756,898 B2 | 7/2010 | Passey et al. | |
| 7,779,048 B2 | 8/2010 | Fachan et al. | |
| 7,783,666 B1 | 8/2010 | Zhuge et al. | |
| 7,788,303 B2 | 8/2010 | Mikesell et al. | |
| 7,797,283 B2 | 9/2010 | Fachan et al. | |
| 7,797,323 B1 | 9/2010 | Eshghi et al. | |
| 7,822,932 B2 | 10/2010 | Fachan et al. | |
| 7,840,536 B1 | 11/2010 | Ahal et al. | |
| 7,844,617 B2 | 11/2010 | Lemar et al. | |
| 7,848,261 B2 | 12/2010 | Fachan | |
| 7,870,345 B2 | 1/2011 | Issaquah et al. | |
| 7,882,068 B2 | 2/2011 | Schack et al. | |
| 7,882,071 B2 | 2/2011 | Fachan et al. | |
| 7,899,800 B2 | 3/2011 | Fachan et al. | |
| 7,900,015 B2 | 3/2011 | Fachan et al. | |
| 7,917,474 B2 | 3/2011 | Passey et al. | |
| 7,937,421 B2 | 5/2011 | Mikesell et al. | |
| 7,949,636 B2 | 5/2011 | Akidau et al. | |
| 7,949,692 B2 | 5/2011 | Lemar et al. | |
| 7,953,704 B2 | 5/2011 | Anderson et al. | |
| 7,953,709 B2 | 5/2011 | Akidau et al. | |
| 7,962,779 B2 | 6/2011 | Patel et al. | |
| 7,966,289 B2 | 6/2011 | Lu et al. | |
| 7,971,021 B2 | 6/2011 | Daud et al. | |
| 7,984,324 B2 | 7/2011 | Daud et al. | |
| 8,005,865 B2 | 8/2011 | Passey et al. | |
| 8,010,493 B2 | 8/2011 | Anderson et al. | |
| 8,015,156 B2 | 9/2011 | Anderson et al. | |
| 8,015,216 B2 | 9/2011 | Fachan et al. | |
| 8,027,984 B2 | 9/2011 | Passey et al. | |
| 8,051,425 B2 | 11/2011 | Godman et al. | |
| 8,054,765 B2 | 11/2011 | Passey et al. | |
| 8,055,711 B2 | 11/2011 | Fachan et al. | |
| 8,060,521 B2 | 11/2011 | Lemar et al. | |
| 8,082,379 B2 | 12/2011 | Fachan et al. | |
| 8,112,395 B2 | 2/2012 | Patel et al. | |
| 8,176,013 B2 | 5/2012 | Passey et al. | |
| 2001/0042224 A1 | 11/2001 | Stanfill et al. | |
| 2001/0047451 A1 | 11/2001 | Noble et al. | |
| 2001/0056492 A1 | 12/2001 | Bressoud et al. | |
| 2002/0002661 A1 | 1/2002 | Blumenau et al. | |
| 2002/0010696 A1 | 1/2002 | Izumi | |
| 2002/0029200 A1 | 3/2002 | Dulin et al. | |
| 2002/0035668 A1 | 3/2002 | Nakano et al. | |
| 2002/0038436 A1 * | 3/2002 | Suzuki | 714/6 |
| 2002/0049778 A1 | 4/2002 | Bell et al. | |
| 2002/0055940 A1 | 5/2002 | Elkan | |
| 2002/0072974 A1 | 6/2002 | Pugliese et al. | |
| 2002/0075870 A1 | 6/2002 | de Azevedo et al. | |
| 2002/0078161 A1 | 6/2002 | Cheng | |
| 2002/0078180 A1 | 6/2002 | Miyazawa | |
| 2002/0083078 A1 | 6/2002 | Pardon et al. | |
| 2002/0083118 A1 | 6/2002 | Sim | |
| 2002/0087366 A1 | 7/2002 | Collier et al. | |
| 2002/0095438 A1 | 7/2002 | Rising et al. | |
| 2002/0107877 A1 | 8/2002 | Whiting et al. | |
| 2002/0124137 A1 | 9/2002 | Ulrich et al. | |
| 2002/0138559 A1 | 9/2002 | Ulrich et al. | |
| 2002/0156840 A1 | 10/2002 | Ulrich et al. | |
| 2002/0156891 A1 | 10/2002 | Ulrich et al. | |
| 2002/0156973 A1 | 10/2002 | Ulrich et al. | |
| 2002/0156974 A1 | 10/2002 | Ulrich et al. | |
| 2002/0156975 A1 | 10/2002 | Staub et al. | |
| 2002/0158900 A1 | 10/2002 | Hsieh et al. | |
| 2002/0161846 A1 | 10/2002 | Ulrich et al. | |
| 2002/0161850 A1 | 10/2002 | Ulrich et al. | |
| 2002/0161973 A1 | 10/2002 | Ulrich et al. | |
| 2002/0163889 A1 | 11/2002 | Yemini et al. | |
| 2002/0165942 A1 | 11/2002 | Ulrich et al. | |
| 2002/0166026 A1 | 11/2002 | Ulrich et al. | |
| 2002/0166079 A1 | 11/2002 | Ulrich et al. | |
| 2002/0169827 A1 | 11/2002 | Ulrich et al. | |
| 2002/0170036 A1 | 11/2002 | Cobb et al. | |
| 2002/0174295 A1 | 11/2002 | Ulrich et al. | |
| 2002/0174296 A1 | 11/2002 | Ulrich et al. | |
| 2002/0178162 A1 | 11/2002 | Ulrich et al. | |
| 2002/0191311 A1 | 12/2002 | Ulrich et al. | |
| 2002/0194523 A1 | 12/2002 | Ulrich et al. | |
| 2002/0194526 A1 | 12/2002 | Ulrich et al. | |
| 2002/0198864 A1 | 12/2002 | Ostermann et al. | |
| 2003/0005159 A1 | 1/2003 | Kumhyr | |
| 2003/0009511 A1 | 1/2003 | Giotta et al. | |
| 2003/0014391 A1 | 1/2003 | Evans et al. | |
| 2003/0033308 A1 | 2/2003 | Patel et al. | |
| 2003/0061491 A1 | 3/2003 | Jaskiewicz et al. | |
| 2003/0109253 A1 | 6/2003 | Fenton et al. | |
| 2003/0120863 A1 * | 6/2003 | Lee et al. | 711/114 |
| 2003/0125852 A1 | 7/2003 | Schade et al. | |
| 2003/0126522 A1 | 7/2003 | English et al. | |
| 2003/0131860 A1 | 7/2003 | Ashcraft et al. | |
| 2003/0135514 A1 | 7/2003 | Patel et al. | |
| 2003/0149750 A1 | 8/2003 | Franzenburg | |
| 2003/0158861 A1 | 8/2003 | Sawdon et al. | |
| 2003/0158873 A1 | 8/2003 | Sawdon et al. | |
| 2003/0161302 A1 | 8/2003 | Zimmermann et al. | |
| 2003/0163726 A1 | 8/2003 | Kidd | |
| 2003/0172149 A1 | 9/2003 | Edsall et al. | |
| 2003/0177308 A1 | 9/2003 | Lewalski-Brechter | |
| 2003/0182312 A1 | 9/2003 | Chen et al. | |
| 2003/0182325 A1 | 9/2003 | Manley et al. | |
| 2003/0233385 A1 | 12/2003 | Srinivasa et al. | |
| 2003/0237019 A1 * | 12/2003 | Kleiman et al. | 714/6 |
| 2004/0003053 A1 | 1/2004 | Williams | |
| 2004/0024731 A1 | 2/2004 | Cabrera et al. | |
| 2004/0024963 A1 | 2/2004 | Talagala et al. | |
| 2004/0078680 A1 | 4/2004 | Hu et al. | |
| 2004/0078812 A1 | 4/2004 | Calvert | |
| 2004/0117802 A1 | 6/2004 | Green | |
| 2004/0133670 A1 | 7/2004 | Kaminksky et al. | |
| 2004/0143647 A1 | 7/2004 | Cherkasova | |
| 2004/0153479 A1 | 8/2004 | Mikesell et al. | |
| 2004/0158549 A1 | 8/2004 | Matena et al. | |
| 2004/0174798 A1 | 9/2004 | Riguidel et al. | |
| 2004/0189682 A1 | 9/2004 | Troyansky et al. | |
| 2004/0199734 A1 | 10/2004 | Rajamani et al. | |
| 2004/0199812 A1 | 10/2004 | Earl et al. | |
| 2004/0205141 A1 | 10/2004 | Goland | |
| 2004/0230748 A1 | 11/2004 | Ohba | |
| 2004/0240444 A1 | 12/2004 | Matthews et al. | |
| 2004/0260673 A1 | 12/2004 | Hitz et al. | |
| 2004/0267747 A1 | 12/2004 | Choi et al. | |
| 2005/0010592 A1 | 1/2005 | Guthrie | |
| 2005/0033778 A1 | 2/2005 | Price | |
| 2005/0044197 A1 | 2/2005 | Lai | |
| 2005/0066095 A1 | 3/2005 | Mullick et al. | |
| 2005/0114402 A1 | 5/2005 | Guthrie | |

| | | |
|---|---|---|
| 2005/0114609 A1 | 5/2005 | Shorb |
| 2005/0125456 A1 | 6/2005 | Hara et al. |
| 2005/0131860 A1 | 6/2005 | Livshits |
| 2005/0131990 A1 | 6/2005 | Jewell |
| 2005/0138195 A1 | 6/2005 | Bono |
| 2005/0138252 A1 | 6/2005 | Gwilt |
| 2005/0171960 A1 | 8/2005 | Lomet |
| 2005/0171962 A1 | 8/2005 | Martin et al. |
| 2005/0187889 A1 | 8/2005 | Yasoshima |
| 2005/0188052 A1 | 8/2005 | Ewanchuk et al. |
| 2005/0192993 A1 | 9/2005 | Messinger |
| 2005/0193389 A1 | 9/2005 | Murphy et al. |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047713 A1 | 3/2006 | Gornshtein et al. |
| 2006/0047925 A1 | 3/2006 | Perry |
| 2006/0053263 A1 | 3/2006 | Prahlad et al. |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0123211 A1 | 6/2006 | Derk et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0161920 A1 | 7/2006 | An et al. |
| 2006/0206536 A1 | 9/2006 | Sawdon et al. |
| 2006/0230411 A1 | 10/2006 | Richter et al. |
| 2006/0277432 A1* | 12/2006 | Patel et al. .......... 714/6 |
| 2006/0288161 A1 | 12/2006 | Cavallo |
| 2006/0294589 A1 | 12/2006 | Achanta et al. |
| 2007/0038887 A1 | 2/2007 | Witte et al. |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094449 A1 | 4/2007 | Allison et al. |
| 2007/0094452 A1 | 4/2007 | Fachan |
| 2007/0124337 A1 | 5/2007 | Flam |
| 2007/0168351 A1 | 7/2007 | Fachan |
| 2007/0171919 A1 | 7/2007 | Godman et al. |
| 2007/0192254 A1 | 8/2007 | Hinkle |
| 2007/0195810 A1 | 8/2007 | Fachan |
| 2007/0198518 A1 | 8/2007 | Luchangco et al. |
| 2007/0233684 A1 | 10/2007 | Verma et al. |
| 2007/0233710 A1 | 10/2007 | Passey et al. |
| 2007/0244877 A1 | 10/2007 | Kempka |
| 2007/0255765 A1 | 11/2007 | Robinson |
| 2007/0255921 A1 | 11/2007 | Gole et al. |
| 2007/0288490 A1 | 12/2007 | Longshaw |
| 2008/0005145 A1 | 1/2008 | Worrall |
| 2008/0010507 A1* | 1/2008 | Vingralek .......... 714/7 |
| 2008/0021907 A1 | 1/2008 | Patel et al. |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0059734 A1 | 3/2008 | Mizuno |
| 2008/0126365 A1 | 5/2008 | Fachan et al. |
| 2008/0151724 A1 | 6/2008 | Anderson et al. |
| 2008/0154978 A1 | 6/2008 | Lemar et al. |
| 2008/0155191 A1 | 6/2008 | Anderson |
| 2008/0168209 A1 | 7/2008 | Davison |
| 2008/0168304 A1 | 7/2008 | Flynn et al. |
| 2008/0168458 A1 | 7/2008 | Fachan et al. |
| 2008/0243773 A1 | 10/2008 | Patel et al. |
| 2008/0256103 A1 | 10/2008 | Fachan et al. |
| 2008/0256537 A1 | 10/2008 | Fachan et al. |
| 2008/0256545 A1 | 10/2008 | Fachan et al. |
| 2008/0263549 A1 | 10/2008 | Walker |
| 2008/0294611 A1 | 11/2008 | Anglin et al. |
| 2009/0055399 A1 | 2/2009 | Lu et al. |
| 2009/0055604 A1 | 2/2009 | Lemar et al. |
| 2009/0055607 A1 | 2/2009 | Schack et al. |
| 2009/0125563 A1 | 5/2009 | Wong et al. |
| 2009/0210880 A1 | 8/2009 | Fachan et al. |
| 2009/0248756 A1 | 10/2009 | Akidau et al. |
| 2009/0248765 A1 | 10/2009 | Akidau et al. |
| 2009/0248975 A1 | 10/2009 | Daud et al. |
| 2009/0249013 A1 | 10/2009 | Daud et al. |
| 2009/0252066 A1 | 10/2009 | Passey et al. |
| 2009/0327218 A1 | 12/2009 | Passey et al. |
| 2010/0016155 A1 | 1/2010 | Fachan |
| 2010/0016353 A1 | 1/2010 | Mikesell |
| 2010/0122057 A1 | 5/2010 | Strumpen et al. |
| 2010/0161556 A1 | 6/2010 | Anderson et al. |
| 2010/0161557 A1 | 6/2010 | Anderson et al. |
| 2010/0185592 A1 | 7/2010 | Kryger |
| 2010/0223235 A1 | 9/2010 | Fachan |
| 2010/0235413 A1 | 9/2010 | Patel |
| 2010/0241632 A1 | 9/2010 | Lemar et al. |
| 2010/0306786 A1 | 12/2010 | Passey |
| 2011/0022790 A1 | 1/2011 | Fachan |
| 2011/0035412 A1 | 2/2011 | Fachan |
| 2011/0044209 A1 | 2/2011 | Fachan |
| 2011/0060779 A1 | 3/2011 | Lemar et al. |
| 2011/0087635 A1 | 4/2011 | Fachan |
| 2011/0113211 A1 | 5/2011 | Fachan et al. |
| 2011/0119234 A1 | 5/2011 | Schack et al. |
| 2011/0145195 A1 | 6/2011 | Passey et al. |
| 2011/0153569 A1 | 6/2011 | Fachan et al. |

FOREIGN PATENT DOCUMENTS

| | | |
|---|---|---|
| EP | 1421520 | 5/2004 |
| EP | 1563411 | 8/2005 |
| EP | 2284735 | 2/2011 |
| EP | 2299375 | 3/2011 |
| JP | 04096841 | 3/1992 |
| JP | 2000-047831 | 2/2000 |
| JP | 2000-099282 | 4/2000 |
| JP | 2002-091804 | 3/2002 |
| JP | 2006-506741 | 6/2004 |
| JP | 4464279 | 5/2010 |
| JP | 4504677 | 7/2010 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 A1 | 2/2003 |
| WO | WO 2004/046971 | 6/2004 |
| WO | WO 2008/021527 | 2/2008 |
| WO | WO 2008/021528 | 2/2008 |
| WO | WO 2008/127947 | 10/2008 |

OTHER PUBLICATIONS

May 8, 2008 Int'l Search report PCT/US07/018324, 13 pages.
Steven M. Bauer, Letter to Steve Goldman, Jul. 31, 2006 (including the first page of the patents).
Arthur S. Rose, Letter to Steven M. Bauer, Aug. 7, 2006.
Steven M. Bauer, Letter to Arthur S. Rose, Sep. 25, 2006.
Steven M. Bauer, Letter to Arthur S. Rose, Oct. 31, 2006.
Arthur S. Rose, Letter to Steven M. Bauer, Nov. 9, 2006.
Steven M. Bauer, Letter to Arthur S. Rose, Feb. 6, 2006.
Arthur S. Rose, Letter to Steven M. Bauer, Feb. 23, 2007.
Steven M. Bauer, Letter to Arthur S. Rose, Jun. 7, 2007 (including claim chart).
Arthur S. Rose, Letter to Steven M. Bauer, Jun. 22, 2007.
Todd A. Gerety, Letter to Arthur S. Rose, Jun. 26, 2007 (including exhibits listed separately).
Isilon Systems, "Isilon IQ Plateform Overview", 1-4.
Isilon Systems, "Uncompromising Reliability through Clustered Storage", Sep. 2006, 1-10.
Byteandswitch, "Discovery Chooses Isilon," Apr. 23, 2007, 1.

Taneja Group Technology Analysts, "The Power of InfiniBand and Clustered Storage", Dec. 2005, 1-8.
Arthur S. Rose, Letter to Steven M. Bauer, Aug. 31, 2007.
Ramez Elmasri, Fundamentals of Database Systems 3rd ed, Sep. 30, 1999, Addison-Wesley, pp. 155, 169, 171, 172, 173, 178, 181, 182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Levy E Ed—Institute of Electrical and Electronics Engineers: "Incremental restart (database management)" Proceedings of the International Conference on Data Engineering. Kobe, JP, Apr. 8-12, 1991; [Proceedings of the International Conference on Data Engineering], Los Alamitos, IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
May 18, 2009 Int'l Search report PCT/US08/059798, 18 pages.
Kumar, Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand col. line 1-p. 447, last line.
Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.
Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.
Lougher P. et al., "Scalable storage servers for digital audio and video," International Conference on Storage and Recording Systems, 1994, Keele, UK, Jan. 1, 1994, pp. 140-143.
Oct. 22, 2009 Int'l Preliminary Report on Patentability PCT/US08/059798, 10 pages.
Keidar, et al.: Increasing the Resilience of Distributed and Replicated Database Systems (1998) pp. 1-25.
Reddy, P. Krishna et al., Reducing the blocking in two phase commit with backup sites Apr. 15, 2003, Elsevier, pp. 39-47.
IOS Commands, Feb. 6th, 2005, Pantz.org, [online], <web.archive.org/web/20050206184604/http://pantz.org/os/ios/ioscommands.shtml>, pp. 1-12 as printed.
IP Forwarding with Cisco Routers Lab Exercises, Jun. 15, 1999 [online], <ws.edu.isoc.org/data1999/1481713642400af6a2de65a/ip_fwd_cisco_config.ppt>, pp. 1-11 as printed.
Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached) total 23 pages.
Yoshitake Shinkai, Cluster File System: HAMFS, FUJITSU, Japan, Fujitsu Limited, Jul. 9, 1999, vol. 50, No. 4, pp. 210 to 214 (stamped Citation 2 / English Translation attached) total 16 pages.
Oct. 8, 2008 European Supplemental Search Report EP 02 75 6944, 6 pages.
Jan. 23, 2009 Examination Report EP 02 75 6944, 5 pages.
Duchamp, Dan: "Analysis of Transaction Management Performance", ACM Symposium on Operating Systems Principles, Dec. 1989, pp. 177-190.
Silaghi, Raul et al.: "Porting OMTTs to CORBA", Lecture Notes in Computer Science, vol. 2888/2003, Nov. 2003, pp. 1521-1542.

Dorai et al.:, "Threads: Resource Sharing in SMT Processor for High Single-Transparent Thread Performance", proceedings of the 2002 International Conference on Parallel Architectures and Complication Techniques, Sep. 2002, 12 pages.
Peterson, Zachary Nathaniel Joseph, "Data Placement for Copy-On-Write Using Virtual Contiguity," Master of Science in Computer Science Thesis, University of California, Santa Cruz, Sep. 2002, 67 pages.
HP, Slow Internal Disk, Feb. 22, 2005, p. 2 and 6, in 7 pages.
Shen, et al., Distributed and Dynamic Task Reallocation in Robot Organizations; IEEE 2002, pp. 1019-1024.
Aug. 7, 2009 Office Action in U.S. Appl. No. 11/643,719, filed Dec. 21, 2006.
Sep. 4, 2009 Amendment in U.S. Appl. No. 11/643,719, filed Dec. 21, 2006.
Dec. 15, 2009 Office Action in U.S. Appl. No. 11/643,719, filed Dec. 21, 2006.
Mar. 11, 2010 Amendment in U.S. Appl. No. 11/643,719, filed Dec. 21, 2006.
May 21, 2010 Final Office Action in U.S. Appl. No. 11/643,719, filed Dec. 21, 2006.
Sep. 21, 2010 RCE Amendment in U.S. Appl. No. 11/643,719, filed Dec. 21, 2006.
Dec. 9, 2010 Office Action in U.S. Appl. No. 11/643,719, filed Dec. 21, 2006.
May 24, 2011 Final Office Action in U.S. Appl. No. 11/643,719, filed Dec. 21, 2006.
Jan. 2, 2012 Extended European Search Report EP 2299375, 6 pages.
Nov. 15, 2002 International Search Report PCT/US02/24728.
Apr. 20, 2004 International Search Report PCT/US03/36699.
Aug. 6, 2004 International Search Report PCT/US03/33704.
European Search Report dated May 21, 2007 issued to EP application No. 02756944.1-2201.
Philip A. Bernstein, Vassos Hadzilacos, and Nathan Goodman, *Concurrency Control and Recovery in Database Systems*, Addison-Wesley, 1987.
Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.
Kenneth P. Birman, *Building Secure and Reliable Network Applications*, Manning, 1996, pp. 1-327.
Kenneth P. Birman, *Building Secure and Reliable Network Applications*, Manning, 1996, pp. 328-619.
Coulouris et al., *Distributed Systems Concepts and Design*; Addison-Wesley, Second Edition, 1994, pp. 353-371 and 377-405.
Jim Gray and Andreas Reuter, *Transaction Processing: Concepts and Techniques*, Morgan Kaufmann, 1993, pp. 1-328.
Jim Gray and Andreas Reuter, *Transaction Processing: Concepts and Techniques*, Morgan Kaufmann, 1993, pp. 329-664.
Jim Gray and Andreas Reuter, *Transaction Processing: Concepts and Techniques*, Morgan Kaufmann, 1993, pp. 665-1105.
Nancy A. Lynch, *Distributed Algorithms*, Morgan Kaufmann, 1996, pp. 1-409.
Nancy A. Lynch, Distributed Algorithms, Morgan Kaufmann, 1996 pp. 410-871.
Sape Mullender, editor, *Distributed Systems ($2^{nd}$ Ed.)*, ACM Press/Addison-Wesley Publishing Co., New York, NY, USA, 1993, pp. 1-327.
Sape Mullender, editor, *Distributed Systems ($2^{nd}$ Ed.)*, ACM Press/Addison-Wesley Publishing Co., New York, NY, USA, 1993, pp. 328-604.
Gibson, Garth a. et al., *The Scotch Parallel Storage System*, IEEE, 1995, pp. 403-410.
Gerhard Weikum, et al., *Transactional Information Systems: Theory, Algorithms, and the Practice of Concurrency Control and Recovery*, Morgan Kaufmann, 2002, pp. 1-450.
Gerhard Weikum, et al., *Transactional Information Systems: Theory, Algorithms, and the Practice of Concurrency Control and Recovery*, Morgan Kaufmann, 2002, pp. 451-863.

Sanjay Ghemawat et al., *The Google File System, Symposium on Operating Systems Principles*, Oct. 19-22, 2003, 15 pages, Bolton Landing, NY.

Pei Cao et al., The TickerTAIP parallel RAID architecture, 1993, 12 pages, Princeton, NJ.

Pei Cao et al., The TickerTAIP parallel RAID architecture, ACM Transactions on Computer Systems, vol. 12, No. 3, Aug. 1994, 34 pages, Palto Alto, California.

Bob Duzett, et al., *An Overview of the nCube 3 Supercomputer*, IEEE, Jul. 1992, pp. 458-464.

John Henry Hartman, *The Zebra Striped Network File System*, (Sc.B. (Brown University) 1987, pp. 1-148.

Darrell D.E, Long et al., *Swift/RAID: A Distributed RAID System*, Computing Systems, vol. 7, No. 3 Summer 1994, pp. 333-359.

Michael Stonebraker et al., *Distributed Raid: A new Multiple copy Algorithm*, IEEE 1990, pp. 430-434, Berkeley, California.

Stallings, William, *Operating Systems*, Prentice Hall, Fourth Edition; 2001, pp. 197-253 and 265-293.

United States Court of Appeals, Federal Circuit, *Seachange International, Inc.* vs. *nCUBE, Corp.*, Oct. 26, 2004, 28 pages.

United States Court of Appeals, Federal Circuit, *Seachange International, Inc.* vs. *C-Corp, Inc.*, Jun. 29, 2005, 22 pages.

United States District Court, Delaware, *Seachange International, Inc.* vs. *nCUBE, Corp.*, Apr. 7, 2004, 13 pages.

United States District Court, Delaware, *Seachange International, Inc.* vs. *nCUBE, Corp.*, Aug. 29, 2000, 12 pages.

\* cited by examiner

SYSTEMS AND METHODS FOR MANAGING UNAVAILABLE STORAGE DEVICES

LIMITED COPYRIGHT AUTHORIZATION

A portion of disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF THE INVENTION

This invention relates generally to storage devices, and more specifically to managing storage devices in a computer system.

BACKGROUND

In recent years, the amount of data stored digitally on computer storage devices has increased dramatically. To accommodate increasing data storage needs, larger capacity storage devices have been developed. Typically, these storage devices are a single magnetic storage disk. Unfortunately, multiple concurrent access requests to a single storage drive can slow data reads and writes to a single drive system. One response to this problem has been to connect a plurality of storage devices to form a storage node. On storage nodes, data may be distributed over several storage disks. For example, a read operation for a file distributed over several storage drives may be faster than for a file located on a single drive because a distributed system permits parallel read requests for smaller portions of the file. Another response has been to connect a plurality of storage nodes to form a storage system of even larger capacity, referred to as a "cluster."

One problem associated with distributed systems is drive failure and data loss. Though read and write access times tend to decrease as the number of storage devices in a system increase, the chances of storage device failures also increase as the number of storage devices increases. Thus, a distributed system is vulnerable to both temporary and permanent unavailability of storage devices.

When a storage device, for example, either a storage drive or a storage node, becomes unavailable, storage systems have to remove the storage device from the system and fully reconstruct the devices. As storage devices become increasingly larger, the amount of time required to fully reconstruct an unavailable storage device increases correspondingly, which affects response time and further exacerbates the risk of permanent data loss due to multiple device failures.

SUMMARY OF THE INVENTION

Because of the foregoing challenges and limitations, there is a need to provide a system that manages a set storage devices even if one or more of the storage devices becomes unavailable.

In one embodiment, a method for managing unavailable storage devices comprises detecting that a troubled storage device is unavailable, wherein a data set is stored on the troubled storage device, responding to a read or write request for data at least a portion of the data set while the troubled storage device is unavailable, and detecting that the troubled storage device is available and providing access to the data set stored on the troubled storage device without full reconstruction of the troubled storage device.

In another embodiment, a storage system for managing unavailable storage devices comprises a first storage device configured to respond to a read or write request for at least a portion of the data set after the first storage device returns from an unavailable state without full reconstruction of the first storage device. In one embodiment, the storage system further comprises at least one operational storage device configured to store a representation of at least a portion of the data set and provide access to the representation of at least a portion of the data set if the first storage device is unavailable.

In a further embodiment, a storage system for managing storage devices comprises a plurality of storage devices configured to store data distributed among at least two of the plurality of storage devices. In one embodiment, the storage system is further configured such that if one or more of the plurality of storage devices becomes unavailable and then becomes available again, the data is available after the one or more of the plurality of storage devices becomes available again.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

DETAILED DESCRIPTION OF PREFERRED EMBODIMENTS

Figure 1:
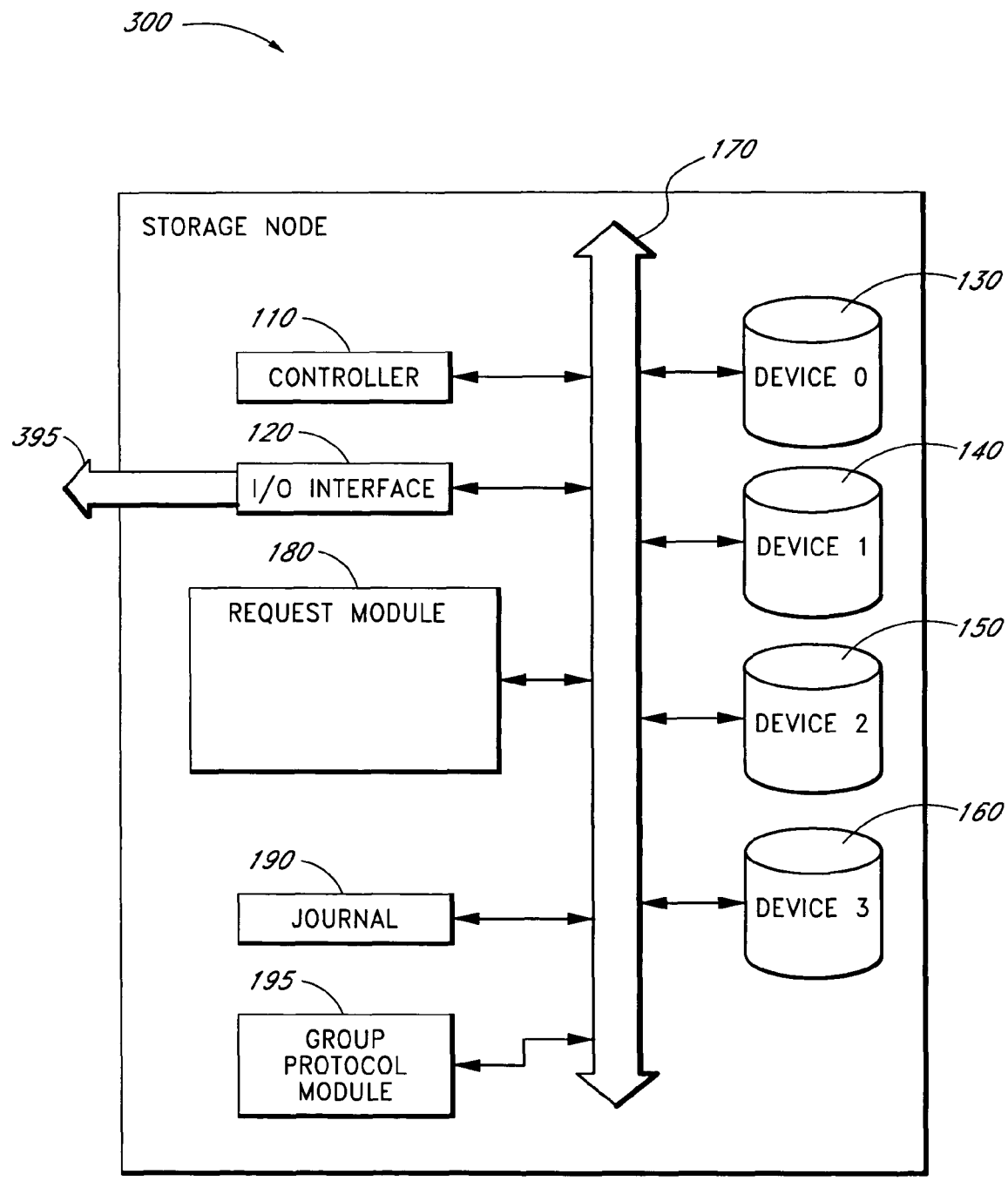
FIG. 1 illustrates one embodiment of a storage device.

Systems and methods which represent exemplary embodiments of the invention will now be described with reference to the drawings. Variations to the systems and methods which represent other embodiments will also be described. The terminology used in the description presented herein is not intended to be interpreted in any limited or restrictive manner, simply because it is being utilized in conjunction with a detailed description of certain specific embodiments. Furthermore, embodiments of the invention may include several novel features, no single one of which is solely responsible for its desirable attributes or which is essential to practicing the systems and methods described herein.

I. Overview

In one embodiment, the storage system provides access to data stored on a set of storage devices even when one of the storage devices is unavailable. While the storage device is unavailable, the storage system reconstructs the requested data and stores data targeted for the unavailable drive in a new location. Even though unavailable, the storage device does not have to be fully reconstructed and replaced, but can return to the storage system once it becomes available. Thus, in such embodiments, access to data on the storage devices continues with out significant interruption.

As used herein, the term "storage device" generally refers to a device configured to store data, including, for example, a storage drive, such as a single hard drive in an array of hard drives or in a storage node or an array of storage nodes, where each of the storage nodes may comprise multiple hard drives.

In one embodiment, a user or client device communicates with a storage system comprising one or more storage devices. In one embodiment, sets of data stored on the storage system (generically referred to herein as "data sets" or "files") are striped, or distributed, across two or more of the storage devices, such as across two or more storage drives or two or more storage nodes. In one embodiment, files are divided into stripes of two or more data blocks and striping involves storing data blocks of a file on two or more storage devices. For example, if a file comprises two data blocks, a first data block of the file may be stored on a first storage device and a second data block of the file may be stored on a second storage device. A map data structure stores information on where the data is stored.

In addition to storing the data blocks of files on the storage devices, some embodiments may also store data protection data associated with the data. One example of data protection data is parity data, however, there are many other types of data protection data as discussed in further detail below. Those of ordinary skill in the art will recognize that parity data can be used to reconstruct portions of data that has been corrupted or is otherwise unavailable. In one embodiment, parity data is calculated by XORing two or more bits of data for which parity protection is desired. For example, if four data bits store the values 0110, the parity bit is equal to 0 XOR 1 XOR 1 XOR 0. Thus, the parity bit is 0. This parity bit may then be stored on a storage device and, if any one of the data bits later become lost or unavailable, the lost or unavailable bit can be reconstructed by XORing the remaining bits with the parity bit. With reference to the above-noted data block 0110, if bit one is unavailable (01X0), then bit 1 can be reconstructed using the logical equation 0 (Parity bit) XOR 0 XOR 1 XOR 0 to determine that unavailable bit one is 1. In other embodiments, other parity, error correction, accuracy, or data protection schemes may be used. The map data structure also store information on where the data protection data is stored.

In the embodiment, if one of the storage devices is unavailable, the storage system may use the data protection data to reconstruct the missing data. In addition, the storage system may use the map data structure to track current locations of write data intended for an unavailable storage device, but stored on another storage device.

II. Storage System

FIG. 1 illustrates one embodiment of a storage node 100 used to store data on a set of storage devices. In the embodiment of FIG. 1, the storage node 100 comprises multiple storage devices 130, 140, 150, 160 that are each coupled to a bus 170. An input/output interface 120 is coupled to the bus 170 and is configured to receive and transmit data to and from the storage node 100. The storage node 100 further comprises a controller 110 that is coupled to the bus 170 so that the controller is in communication with other components in the storage node 100. In one embodiment, the controller 110 manages the operations of the devices 130, 140, 150, 160 as read and write requests are received, such as, for example, from a user.

A. Storage Devices

In the exemplary storage node 100, each of the storage devices 130, 140, 150, 160 comprises a hard drive. However, it is recognized that the storage devices 130, 140, 150, 160 may include one or more drives, nodes, disks, clusters, objects, drive partitions, virtual volumes, volumes, drive slices, containers, and so forth. Moreover, the storage devices may be implemented using a variety of products that are well known in the art, such as, for example, ATA100 devices, SCSI devices, and so forth. In addition, the size of the storage devices may be the same size or may be of two or more different sizes.

B. Request Module

In one embodiment, the storage node 100 also includes a request module 180 for handling requests to read data from the storage devices 130, 140, 150, 160 as well as requests to write data to the storage devices 130, 140, 150, 160. The storage node 100 may also include other modules, such as a reconstruction module for starting the reconstruction of one or more unavailable and/or failed storage devices 130, 140, 150, 160. The storage node 100 may also include a restriper module that scans an unavailable storage devices, identifies data stored in the unavailable storage devices and begins moving the data to one or more available storage devices. The storage node 100 may also include a collector module that frees data that is no longer referenced due to writes while a drive was unavailable.

In general, the word module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

C. Group Protocol Module

In some embodiments, the storage node 100 also includes a group protocol module 195. The group protocol module 195 maintains information regarding the storage devices that are available to the storage system for read and/or write access. In one embodiment, the group protocol module 195 communicates with the storage devices 130, 140, 150, 160 and indicates, for example, the current operational state (for example, available, unavailable, up, down, dead) and/or how much space is available on the each device. In one embodiment, the group protocol module 195 comprises information regarding the availability of devices on other storage nodes. In one embodiment, when a device becomes unavailable, the group protocol module 195 notifies other storage nodes in the storage system 200. Similarly, when a previously unavailable device becomes available again, the group protocol module 195 communicates to the information nodes in the storage system.

D. Journal

In some embodiments, the storage node 100 also includes a journal 190, which may comprise one or more memory devices, such as NVRAM, flash ROM, or EEPROM, and/or a hard drive. The journal 190 is configured to store data that is intended to be stored on a device, and may or may not store other data. In an advantageous embodiment, the journal 190 is persistent such that it does not lose data when power to the storage node 100 is lost or interrupted. Thus, in the event of failure of node 100 and/or one or more of the storage devices 130, 140, 150, 160, recovery actions can be taken when power is regained or the storage node 100 reboots to ensure that transactions that were in progress prior to the failure are either completed or are aborted. If an unavailable device does not return to service, for example, the unavailable device is permanently unavailable and the information stored on the journal 190 may be transferred to other devices in the storage node 100 or, alternatively, transferred to storage devices in other storage nodes.

In some embodiments, the journal 190 is implemented as a non-linear journal. Embodiments of a non-linear journal suitable for storing write data are disclosed in U.S. patent application Ser. No. 11/506,597, entitled "Systems And Methods For Providing Nonlinear Journaling," U.S. patent application Ser. No. 11/507,073, entitled "Systems And Methods For Providing Nonlinear Journaling,", U.S. patent application Ser. No. 11/507,070, entitled "Systems And Methods For Providing Nonlinear Journaling," and Ser. No. 11/507,076, entitled "Systems And Methods For Allowing Incremental Journaling," all filed on Aug. 8, 2006, and all of which are hereby incorporated herein by reference in their entirety.

It is also recognized that in some embodiments, the storage system is implemented without using a journal. In such embodiments, the data may be synchronously written to disk during the write, and/or the data may be written, for example, to a persistent write-back cache that saves the data until the storage device becomes available.

E. System Information

The storage node 100 may run on a variety of computer systems such as, for example, a computer, a server, a smart storage unit, and so forth. In one embodiment, the computer may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Palm Pilot OS, Apple® MacOS®, Disk Operating System (DOS), UNIX, IRIX, Solaris, SunOS, FreeBSD, Linux®, or IBM® OS/2® operating systems.

F. Files

As used herein, a file is a collection of data stored in one logical unit that is associated with one or more filenames. For example, the filename "test.txt" may be associated with a file that comprises data representing text characters. The data blocks of the file may be stored at sequential locations on a storage device or, alternatively, portions of the data blocks may be fragmented such that the data blocks are not in one sequential portion on the storage device. In an embodiment where file striping is used, such as in a RAID 5 storage system, for example, data blocks of a file may be stored on multiple storage devices. For example, in a RAID 5 system, data blocks are interleaved across multiple storage devices within an array of storage devices. The stripe width is the size of the data block stored on a single device before moving on to the next device in the device array. On the last device in the device array, redundancy information is stored, rather than data blocks of the file. The redundancy information in RAID 5 is the parity of the previous interleaved data blocks. The process repeats for other data blocks of the file, except that the device that includes the parity data rotates from device to device in the array for each stripe. It is recognized that a variety of striping techniques may be used.

G. Data Protection

In some embodiments the storage system may utilize one or more types of data protection. For example, the storage system may implement one or more error correcting codes. These codes include a code "in which each data signal conforms to specific rules of construction so that departures from this construction in the received signal can generally be automatically detected and corrected. It is used in computer data storage, for example in dynamic RAM, and in data transmission." (http://en.wikipedia.org/wiki/Error_correcting_code). Examples of error correction code include, but are not limited to, Hamming code, Reed-Solomon code, Reed-Muller code, Binary Golay code, convolutional code, and turbo code. In some embodiments, the simplest error correcting codes can correct single-bit errors and detect double-bit errors, and other codes can detect or correct multi-bit errors.

In addition, the error correction code may include forward error correction, erasure code, fountain code, parity protection, and so forth. "Forward error correction (FEC) is a system of error control for data transmission, whereby the sender adds redundant to its messages, which allows the receiver to detect and correct errors (within some bound) without the need to ask the sender for additional data." (http://en.wikipedia.org/wiki/forward_error_correction). Fountain codes, also known as rateless erasure codes, are "a class of erasure codes with the property that a potentially limitless sequence of encoding symbols can be generated from a given set of source symbols such that the original source symbols can be recovered from any subset of the encoding symbols of size equal to or only slightly larger than the number of source symbols." (http://en.wikipedia.org/wiki/Fountain_code). "An erasure code transforms a message of n blocks into a message with >n blocks such that the original message can be recovered from a subset of those blocks" such that the "fraction of the blocks required is called the rate, denoted r (http://en.wikipedia.org/wiki/Erasure_code). "Optimal erasure codes produce n/r blocks where any n blocks is sufficient to recover the original message." (http://en.wikipedia.org/wiki/Erasure_code). "Unfortunately optimal codes are costly (in terms of memory usage, CPU time or both) when n is large, and so near optimal erasure codes are often used," and "[t]hese require $(1+\epsilon)n$ blocks to recover the message. Reducing ε can be done at the cost of CPU time." (http://en.wikipedia.org/wiki/Erasure_code).

The data protection may include other error correction methods, such as, for example, Network Appliance's RAID double parity methods, which includes storing data in horizontal rows, calculating parity for data in the row, and storing the parity in a separate row parity disks along with other double parity methods, diagonal parity methods, and so forth.

In another embodiment, odd parity may be used such that an additional NOT logical operator is applied after XORing data bits in order to determine the unavailable bit. Those of skill in the art will appreciate that there are other parity schemes that may be used in striping data and recovering lost data in a storage system. Any suitable scheme may be used in conjunction with the systems and methods described herein.

III. Example Scenario of a Down Drive

For purposes of illustration, an example scenario of a set of drives will be discussed wherein one of the drives becomes unavailable while the storage system is receiving read and write requests. This example scenario is just one of many possible scenarios and is meant only to illustrate some embodiments of the storage system.

A. Data Map

Figure 2A:
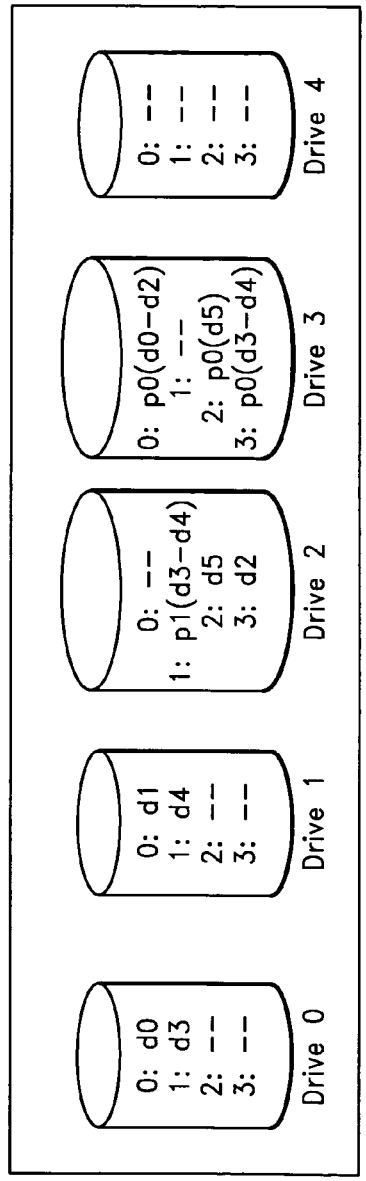
FIGS. 2A, 2B, 2C, 2D, and 2E illustrate one embodiment of an example scenario where one of a set of drives goes down and then returns.

FIG. 2A illustrates an example scenario where one of a set of drives goes down and then returns to the storage system. The storage system includes five drives, Drive 0, Drive 1, Drive 2, Drive 3, and Drive 4. The storage system stores a set of data d0, d1, d2, d3, d4, and d5 wherein the data is protected using different types of parity protection. Data d0, d1, and d2 are protected using 3+1 parity protection, where p0(d0–d2) is the related parity data. Data d3 and d4 are protected using 2+2 parity protection, where p0(d3–d4) and p1(d3–d4) are the related parity data. Data d5 is protected using 2× mirroring or 1+1 parity, where p0(d5) is the related parity data. The storage system also includes a map data structure that stores the locations of the data and the parity data. As set forth in the map and as shown in the drives, d0 is stored on Drive 0 at location 0, d1 is stored on Drive 1 at location 0, d2 is stored on Drive 2 at location 3, d3 is stored on Drive 0 at location 1, d4 is stored on Drive 1 at location 1, d5 is stored on Drive 2 at location 2, p0(d0–d2) is stored on Drive 3 at location 0, p0(d3–d4) is stored on Drive 3 at location 3, p1(d3–d4) is stored on Drive 2 at location 1, and p0(d5) is stored on Drive 3 at location 2.

Figure 2B:
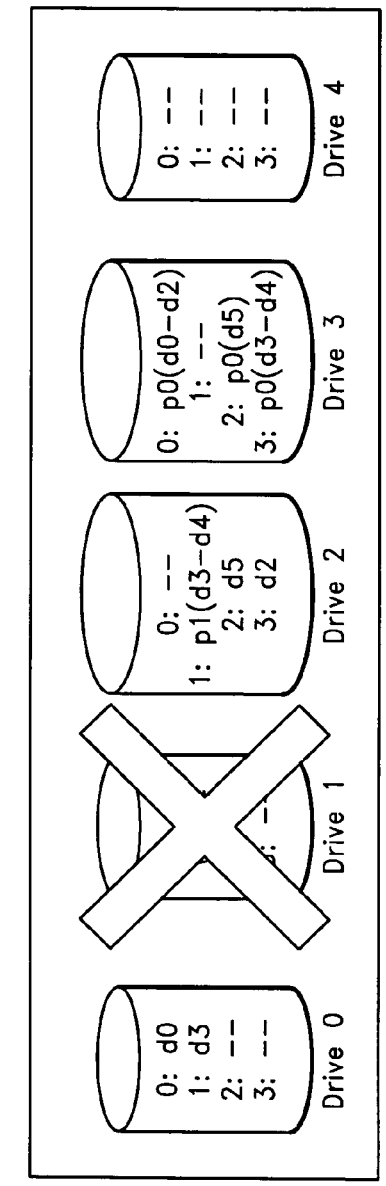

In FIG. 2B, Drive 1 becomes unavailable, such as, for example, because the connection to Drive 1 is unplugged. If the storage system receives a read request for d1, then the storage system will read d0 from Drive 0, d2 from Drive 2 and p0(d0–d2) from Drive 3 and then reconstruct d1 and return d1.

Figure 2C:
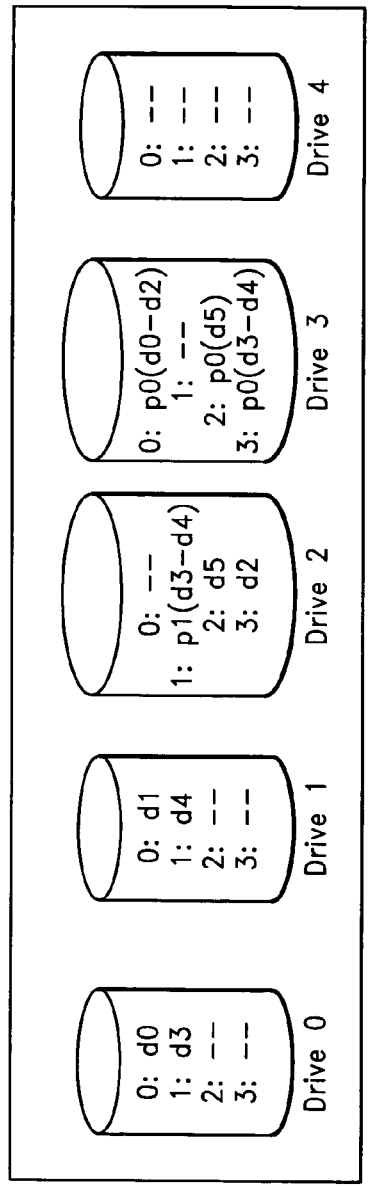

In FIG. 2C, Drive 1 becomes available, such as, for example, the connection to Drive 1 is plugged back in. The storage system is the same as before Drive 1 became unavailable. Moreover, even though Drive 1 became unavailable, Drive 1 did not have to be removed from the storage system and fully recreated. Instead, once it became available, it was integrated back into the storage system and made available.

Figure 2D:
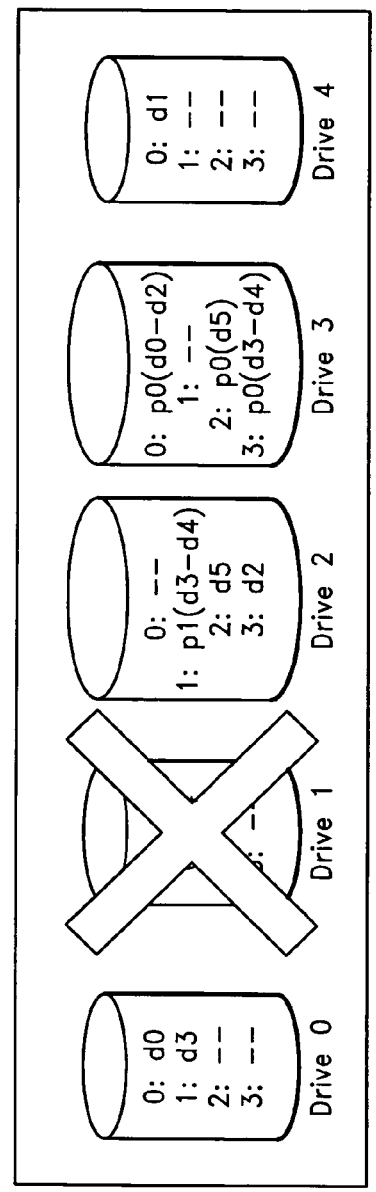

In FIG. 2D, Drive 1 becomes unavailable, and the storage system receives a write request for d0, d1, and d2. The storage system determines whether all of the data locations for d0, d1, d2, and their corresponding parity data p0(d0–d2) are available. Because Drive 1 is not available for d1, then the storage system decides to store d1 on Drive 4 at location 0, which maintains the data protection by not having d1 on the same drive as the other data or parity data. Then the storage system updates the map so that the location for d1 is Drive 4, location 0 as shown in the map for FIG. 2D. The storage system then writes the data blocks d0 to Drive 0, location 0, d1 to Drive 4, location 0, and d2 to Drive 2, location 3; computes the parity data p0(d0–d2), and stores the parity data p0(d0–d2) on Drive 3, location 0.

Figure 2E:
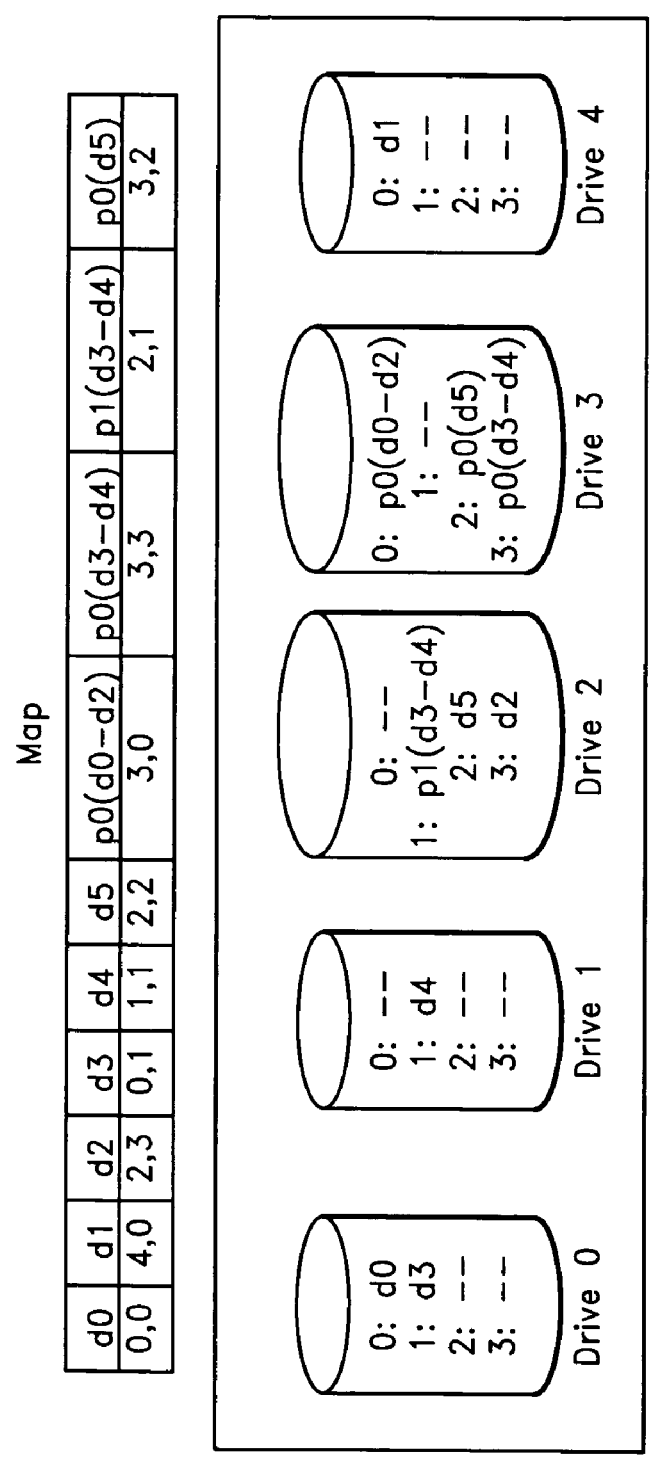

In FIG. 2E, Drive 1 becomes available and the location of the data that was moved from Drive 1 while it was unavailable remains stored on the newly assigned drive and appropriately reference in the map. In addition, data that was not written while Drive 1 was not moved and remains on Drive 1 and is now accessible on Drive 1, such as, for example, d4. Again, even though Drive 1 became unavailable, Drive 1 did not have to be removed from the storage system and fully recreated. Instead, once it became available, it was integrated back into the storage system and made available.

It is recognized that in some embodiments, after the storage system recognizes that a drive is unavailable, the storage system may begin to move the data from the unavailable drive to another drive so that in case the drive becomes permanently unavailable the migration process has already begun, but if the drive becomes available, the data that has not been moved remains on the now available drive. It is also recognized that the example scenario of FIGS. 2A, 2B, 2C, 2D, and 2E are meant only to illustrate embodiments of a storage system and not to limit the scope of the invention.

B. Journal

In some embodiments, the storage system includes a journal for storing write transactions for the drives. In some circumstances, the actual writes to the disks of the drives d0 not occur right away. Accordingly, after a write request is processed, the data is stored in the journal until the journal is flushed. When the journal is flushed, it writes the data to the available disks. However, if a drive is not available, the data can remain in the journal until the drive becomes available and at that time it is written to the drives disk. The data can remain in the journal until the drive becomes available or the drive becomes permanently unavailable wherein the data is then removed from the journal. In other systems, once a drive is marked as unavailable, all data stored in the journal for that drive is deleted and the drive is recreated even if a drive is only down for a very short time period and fully functional when it returns and becomes available.

Figure 3A:
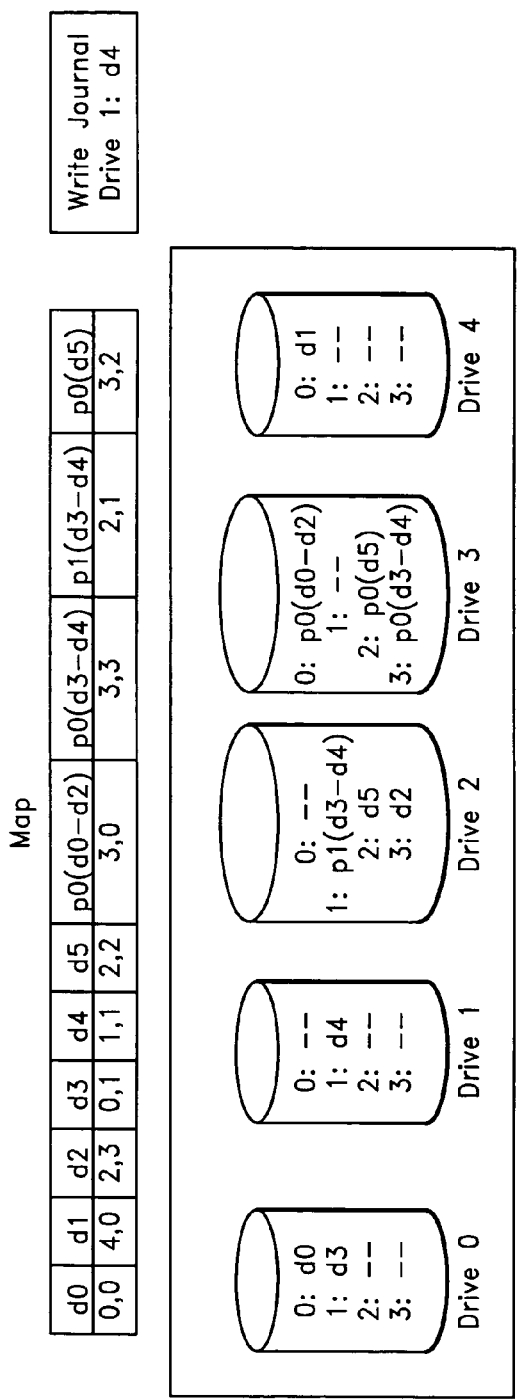
FIGS. 3A, 3B, and 3C illustrate one embodiment of an example scenario of a write journal when a drive goes down and then returns.
Figure 3B:
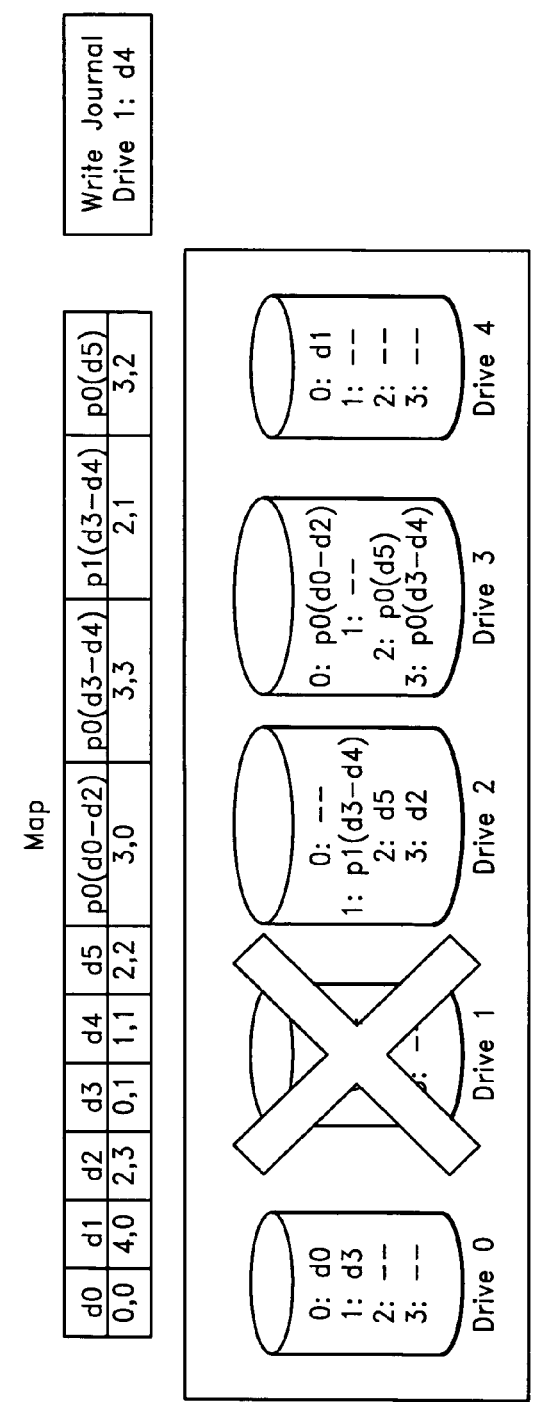
Figure 3C:
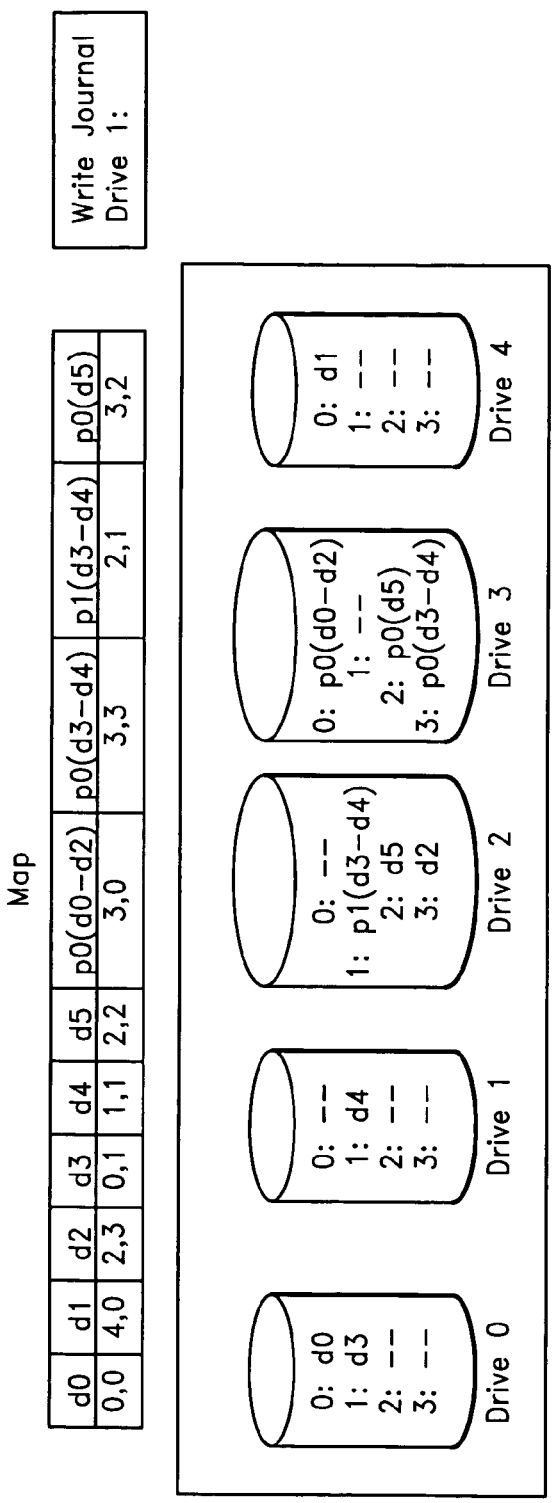

FIGS. 3A, 3B, and 3C illustrate one embodiment of an example scenario of a write journal when a drive becomes unavailable and then becomes available. In FIG. 3A, all of the drives are available so their status is set to UP. The storage system then receives a request to write d4 on Drive 1 at location 1 with a new data value. The storage system stores d4 in the journal associating it with Drive 1 and waits for the journal to be flushed. In FIG. 3B, Drive 1 goes becomes unavailable and the status is set to DOWN. The journal is flushed, but because Drive 1 is DOWN, d4 is kept in the journal. In FIG. 3C, Drive 1 becomes available and the status is set to UP. When the journal is flushed, d4 is written to Drive 1 and removed from the journal.

Again, even though Drive 1 became unavailable, the data destined for Drive 1 did not have to be deleted from the journal. Instead, once Drive 1 became available, it was integrated back into the system and the data was properly stored on the disk of Drive 1.

It is recognized that the journal can be implemented in many different ways and that the storage system may not include a journal as set forth above. This example scenario is meant only to illustrate some embodiments of a storage system and not to limit the scope of the invention.

IV. Read Request

Figure 4:
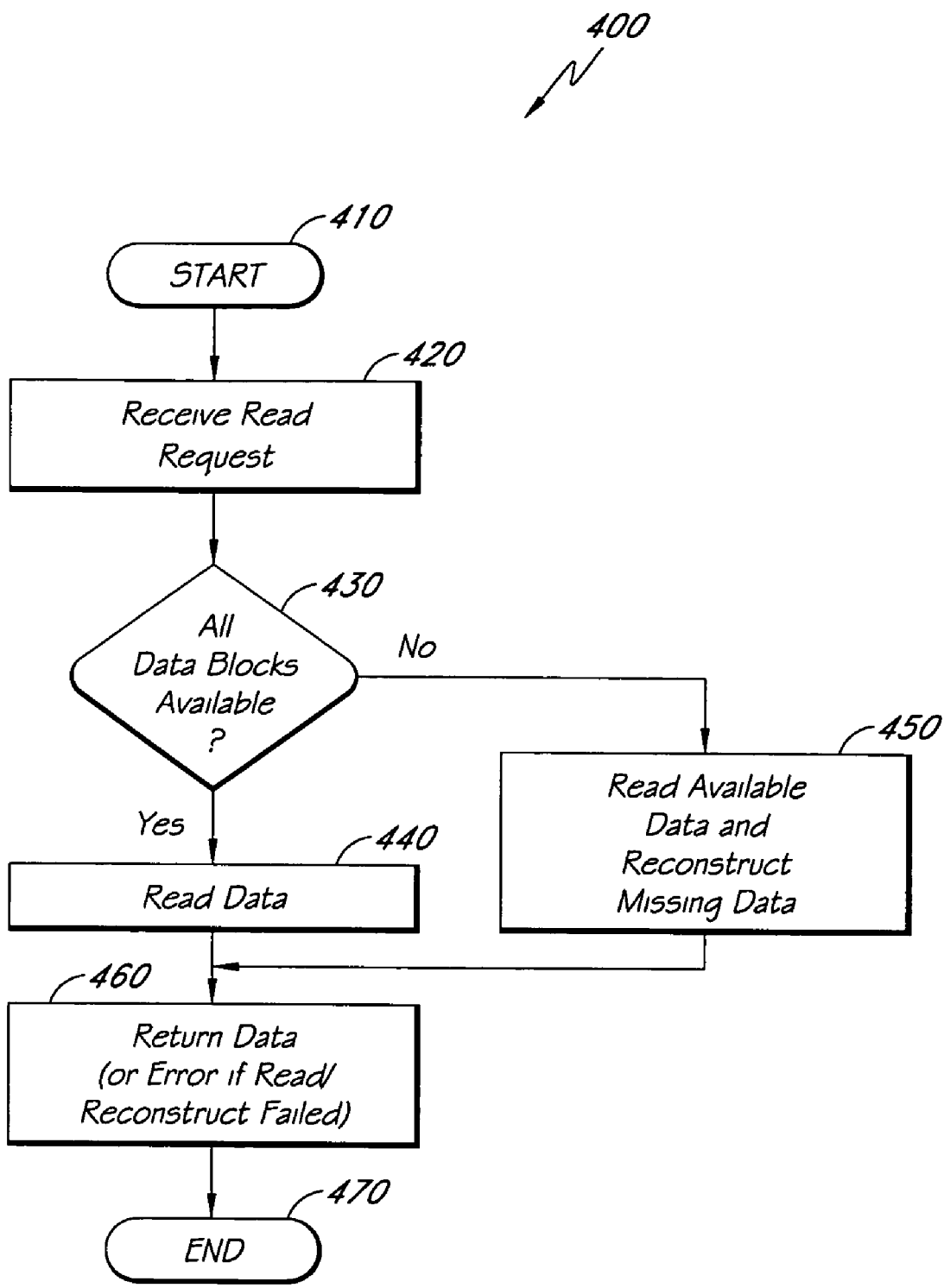
FIG. 4 illustrates one embodiment of a flowchart of operations for a read.

FIG. 4 illustrates one embodiment of a flowchart of operations for processing a read request. Beginning at a start state 410, the read request process 400 proceeds to the next state and receives a read request 420. The read request 420 may be for one or more blocks of data. The read request process 400 then determines whether all data blocks are available 430. If all data blocks are available, the read request process 400 reads the data 440. If all data blocks are not available, then the read request process 400 reads the available data and if possible reconstructs the missing data using the data protection data 450. Next, the read request process 400 returns the data blocks (from the read and/or the reconstruction) or an error message if the read and/or the reconstruction failed 460 and proceeds to an end state 470.

In one embodiment, the reconstruction may fail if, for example, there is not enough data protection data to reconstruct the unavailable data blocks, such as, for example, if the parity is 4+1 and two of the data blocks are unavailable.

While FIG. 4 illustrates one embodiment of processing a read request, it is recognized that a variety of embodiments may be used. For example, the read request process 400 may read the available data and then determine whether all data blocks are available. Moreover, depending on the embodiment, certain of the blocks described in the figure above may be removed, others may be added, and the sequence may be altered.

V. Write Request

Figure 5:
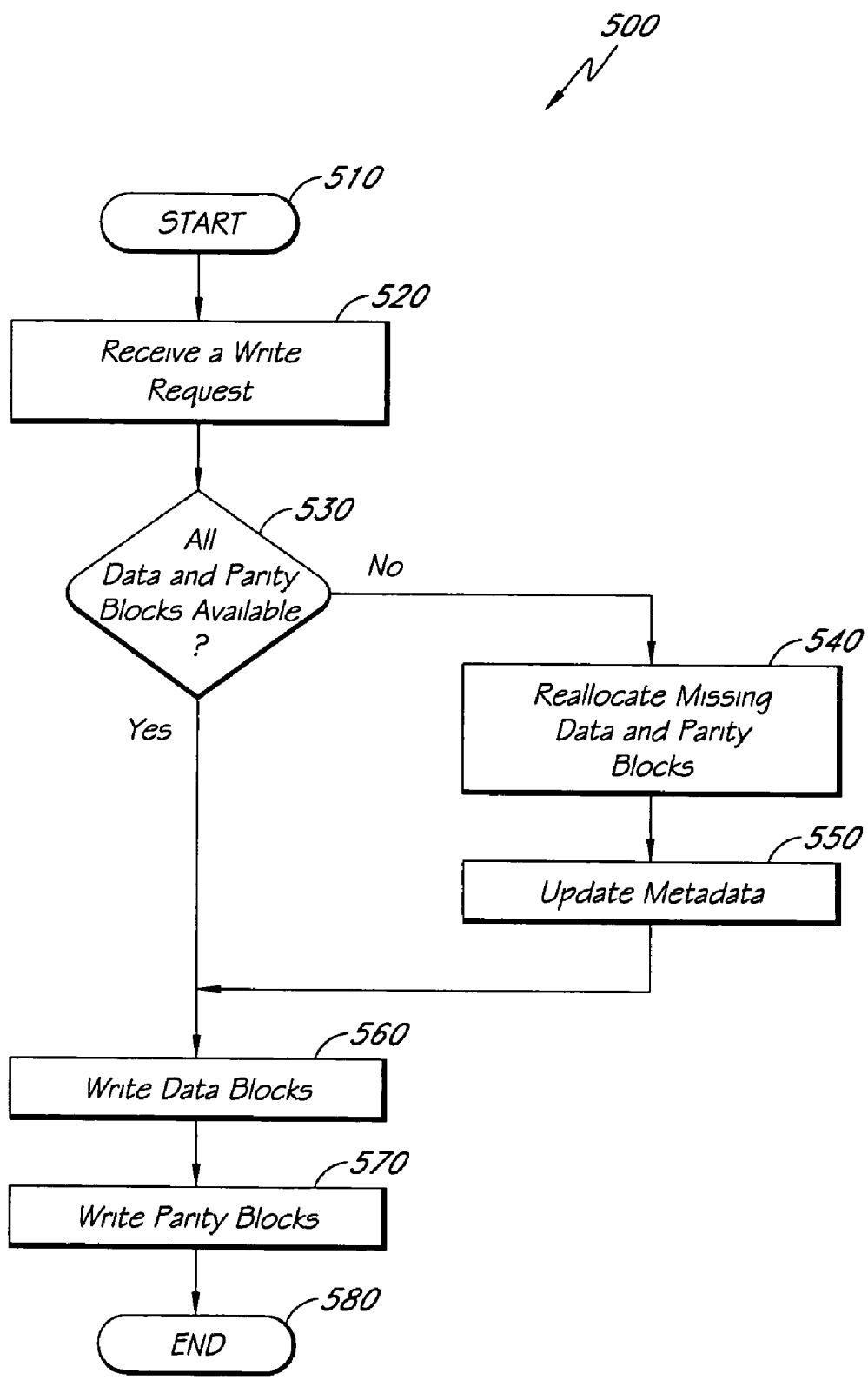
FIG. 5 illustrates one embodiment of a flowchart of operations for a write.

FIG. 5 illustrates one embodiment of a flowchart of operations for performing a write request. Beginning at a start state 510, the write request process 500 proceeds to the next state and receives a write request 520. Proceeding to the next state, the write request process 500 determines whether the devices on which the data blocks and parity blocks are to be stored are available 530. The write request may, for example, check the map data structure entries for each of the data blocks and parity blocks to determine the devices on which they will be stored, whereas in other embodiments, the drives on which they will be stored are provided to the write request process 500. Moreover, to determine whether a device is available, the write request process 500 may check the group management protocol data that indicates the states of the devices. If there is more than one device not available, the write request process 500 determines new locations for the data and/or parity blocks 540 and updates the metadata to correspond to the new locations 550. Next, the write request process 500 writes the data blocks to the appropriate devices 560, writes the parity data 570, and returns to an end state 580.

In one embodiment, the write request process 500 may fail and/or return an error if, for example, there is not enough room to store the data and/or parity blocks on other devices, such as, for example, if the parity is 4+1, there are six drives and two of the drives are unavailable. In such a scenario, the write request process 500 may return an error and/or may store the data in any available space, but return a message that some of the data is stored without the requested data protection.

While FIG. 5 illustrates one embodiment of processing a write request, it is recognized that a variety of embodiments may be used. For example, the write request process 500 may compute the data protection data or the data protection data may be received by the write request process 500. Moreover, depending on the embodiment, certain of the blocks described in the figure above may be removed, others may be added, and the sequence may be altered.

As discussed in detail below, the storage system may be implemented as part of a distributed file system. In one embodiment of a distributed file system, the write request also checks to see if all copies of the metadata storing the locations of the data is stored on available nodes. One embodiment of pseudocode for implementing a write request process is as follows:

```
Write( ) {
    If (not all inodes available) {
        Re-allocate missing inodes on available drives
        Write new copies of the inode
        Update lin tree to point to new inodes
    }
    If (not all data and parity blocks available) {
        Re-allocate missing data and parity blocks on available
            drives
        Update file metatree to point to new blocks
    }
    For all data blocks b {
        Write_block_to_journal (b)
    }
    For all parity blocks b {
        Write_block_to_journal (b)
    }
}
```

In one embodiment, the inodes store metadata about files, and the LIN tree stores location data for the inodes. While the above psuedocode represents one embodiment of an implementation of a write process for one embodiment of a distributed file system, it is recognized that the write process may be implemented in a variety of ways and is not limited to the exemplary embodiment above.

VI. Journal Flush

Figure 6:
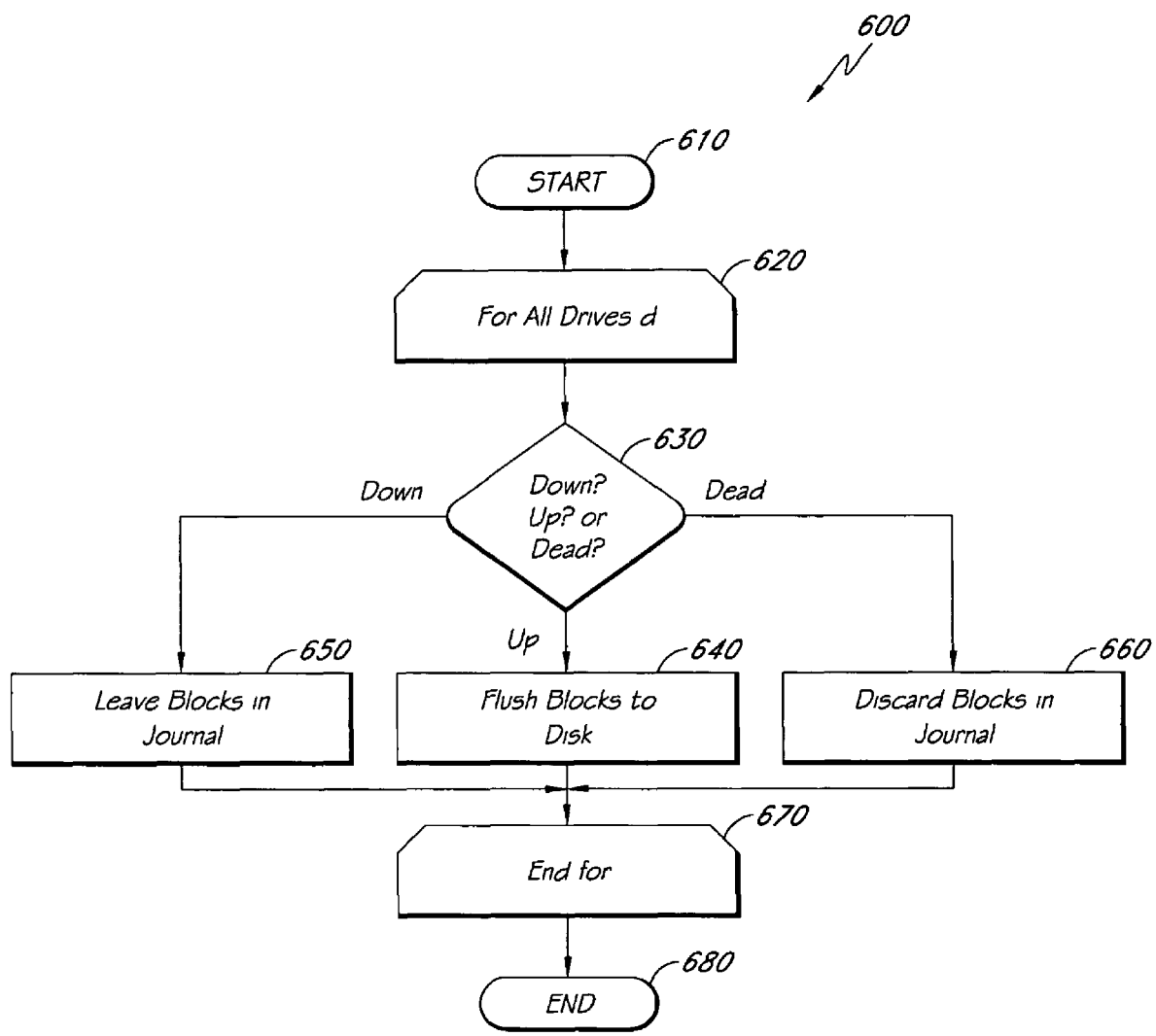
FIG. 6 illustrates one embodiment of a flowchart of operations for a journal flush.

As noted above, in some embodiments, when a write request is processed, the data to be stored to a disk is stored in a journal until the write to the disk until after the write has occurred. FIG. 6 illustrates one embodiment of a flowchart of operations for a journal flush. Beginning at a start state 610, the journal flush process 600 proceeds to the next state and for all devices d 620, the journal flush process 600 determines whether the devices is UP, DOWN or DEAD 630. If the device is UP, the journal flush process 600 flushes the blocks for that device to the device's disk 640. If the device is DOWN, the journal flush process 600 leaves the blocks for that device in the journal 650. If the device is DEAD, the journal flush process 600 discards the blocks in the journal that device 660. Once the devices d have been reviewed 670, the journal flush process 600 proceeds to an end state 680.

While FIG. 6 illustrates one embodiment of flushing the journal, it is recognized that a variety of embodiments may be used. For example, the flush journal process 600 may review more than one device d at a time. In addition, if a device is DEAD, the flush journal process 600 may send the blocks to a process that is handling the reconstruction of the DEAD drive. Moreover, depending on the embodiment, certain of the blocks described in the figure above may be removed, others may be added, and the sequence may be altered.

One embodiment of pseudocode for implementing a journal flush process is as follows:

```
Flush_journal( ) {
    For all drives d {
        If (d is down) {
            Leave blocks in the journal
        } else if (d is up) {
            Flush blocks to disk
            When disk returns success,
```

```
        discard blocks from the journal
    } else if (d is dead) {
        Discard blocks in the journal
    }
  }
}
```

While the above psuedocode represents one embodiment of an implementation of a journal flush process, it is recognized that the journal flush process may be implemented in a variety of ways and is not limited to the exemplary embodiment above.

VII. Distributed System Embodiments

For purposes of illustration, some embodiments will now be described in the context of a distributed system such as, for example a distributed file system. Embodiments of a distributed file system suitable for accommodating reverse lookup requests are disclosed in U.S. patent application Ser. No. 10/007,003, entitled, "Systems And Methods For Providing A Distributed File System Utilizing Metadata To Track Information About Data Stored Throughout The System," filed Nov. 9, 2001 which claims priority to Application No. 60/309,803, entitled "Systems And Methods For Providing A Distributed File System Utilizing Metadata To Track Information About Data Stored Throughout The System," filed Aug. 3, 2001, U.S. Pat. No. 7,156,524 entitled "Systems and Methods for Providing A Distributed File System Incorporating a Virtual Hot Spare," filed Oct. 25, 2002, and U.S. patent application Ser. No. 10/714,326 entitled "Systems And Methods For Restriping Files In A Distributed File System," filed Nov. 14, 2003, which claims priority to Application No. 60/426,464, entitled "Systems And Methods For Restriping Files In A Distributed File System," filed Nov. 14, 2002, all of which are hereby incorporated herein by reference in their entirety.

In one embodiment of a distributed file system, metadata structures, also referred to as inodes, are used to represent and manipulate the files and directories within the system. An inode is a data structure that describes a file or directory and may be stored in a variety of locations including on a storage device.

A directory, similar to a file, is a collection of data stored in one unit under a directory name. A directory, however, is a specialized collection of data regarding elements in a file system. In one embodiment, a file system is organized in a tree-like structure. Directories are organized like the branches of trees. Directories may begin with a root directory and/or may include other branching directories. Files resemble the leaves or the fruit of the tree. Although in the illustrated embodiment an inode represents either a file or a directory, in other embodiments, an inode may include metadata for other elements in a distributed file system, in other distributed systems, in other file systems, or other systems. In some embodiments files d0 not branch, while in other embodiments files may branch.

Figure 7:
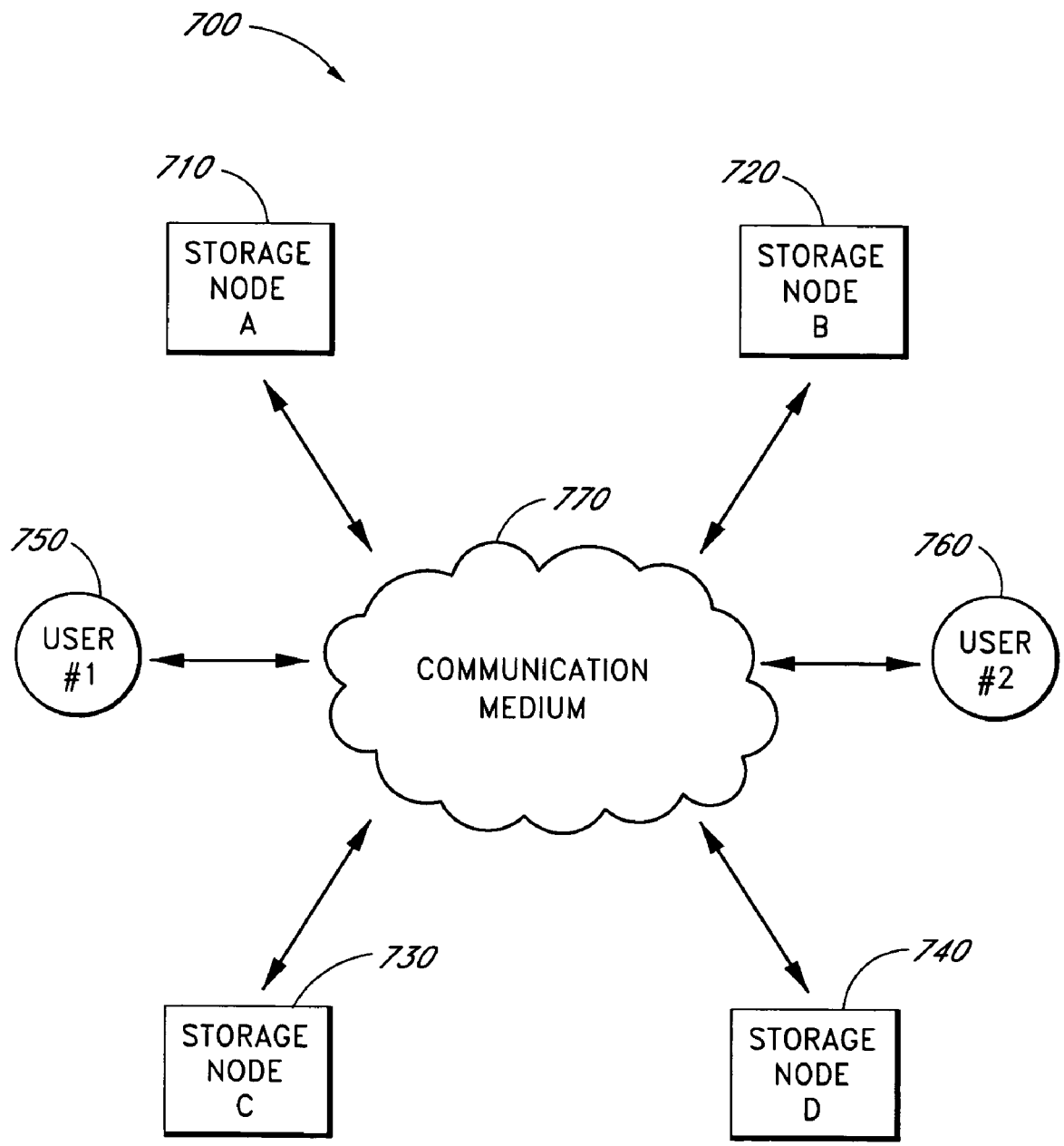
FIG. 7 illustrates one embodiment of connections of storage nodes in one embodiment of a distributed file system.

FIG. 7 illustrates an exemplary distributed system 700 comprising storage nodes 710, 720, 730, 740 and users 750, 760 that are in data communication via a communication medium 770. The communication medium 770 may comprise one or more wired and/or wireless networks of any type, such as SANs, LANs, WANs, MANs, and/or the Internet. In other embodiments, the distributed system 700 may be comprised of hard-wired connections between the storage nodes 710, 720, 730, 740, or any combination of communication types known to one of ordinary skill in the art.

In the embodiment of FIG. 7, the users 750, 760 may request data via any of the storage nodes 710, 720, 730, 740 via the communication medium 770. The users 750, 760 may comprise a personal computer, a mainframe terminal, PDA, cell phone, laptop, a client application, or any device that accesses a storage device in order to read and/or write data.

Figure 8A:
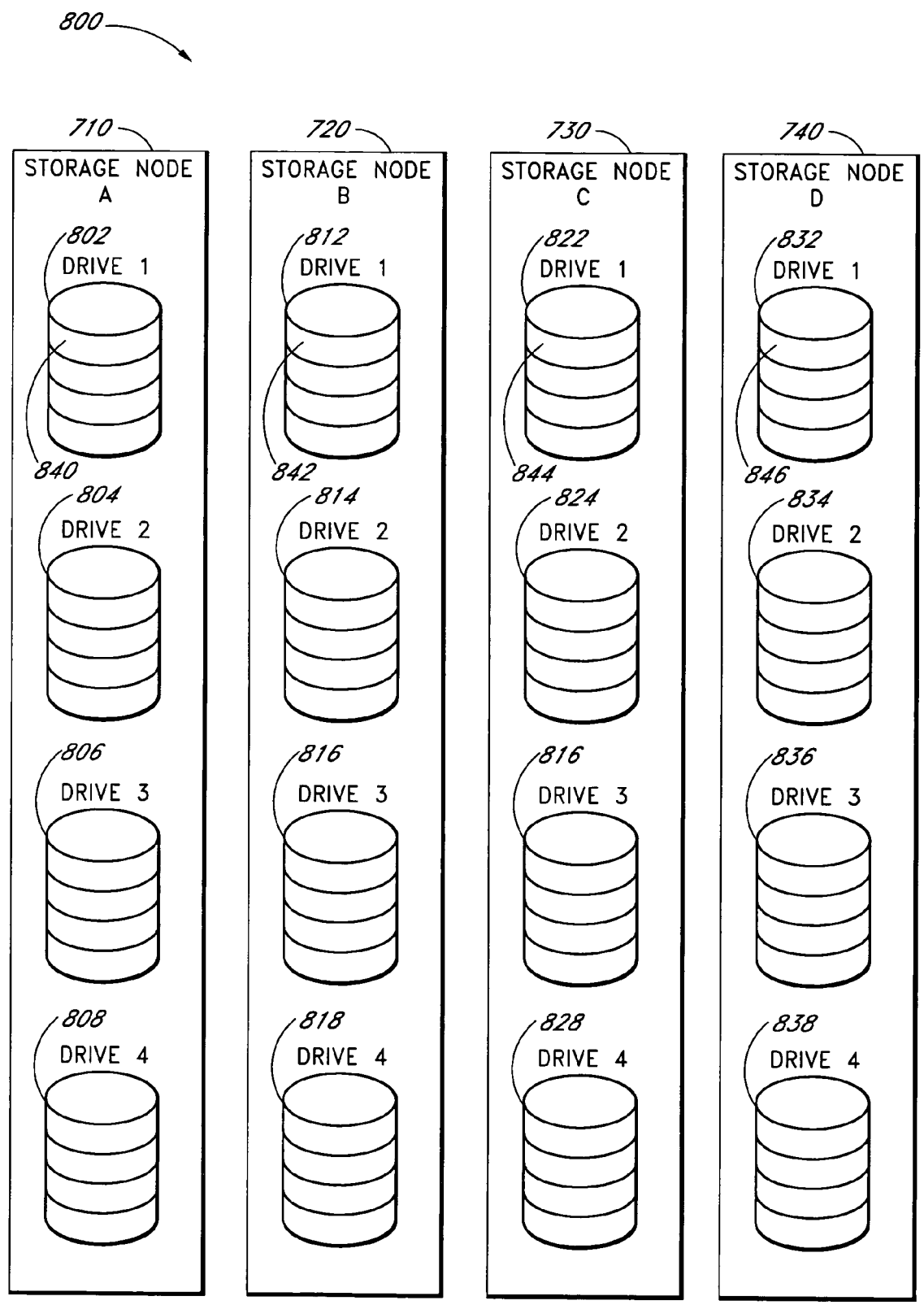
FIG. 8A illustrates one embodiment of data stored in storage nodes in one embodiment of a distributed system.

FIG. 8A illustrates a storage system 700 wherein data is stored on each of four storage nodes 710, 720, 730, 740, where each of the storage nodes comprises multiple storage devices, such as multiple hard drives. For example, storage node 710 comprises hard drives 802, 804, 806, and 808. Where the example embodiment shows the same number of devices for each node, in other embodiments, each node could have different numbers of drives.

Figure 8B:
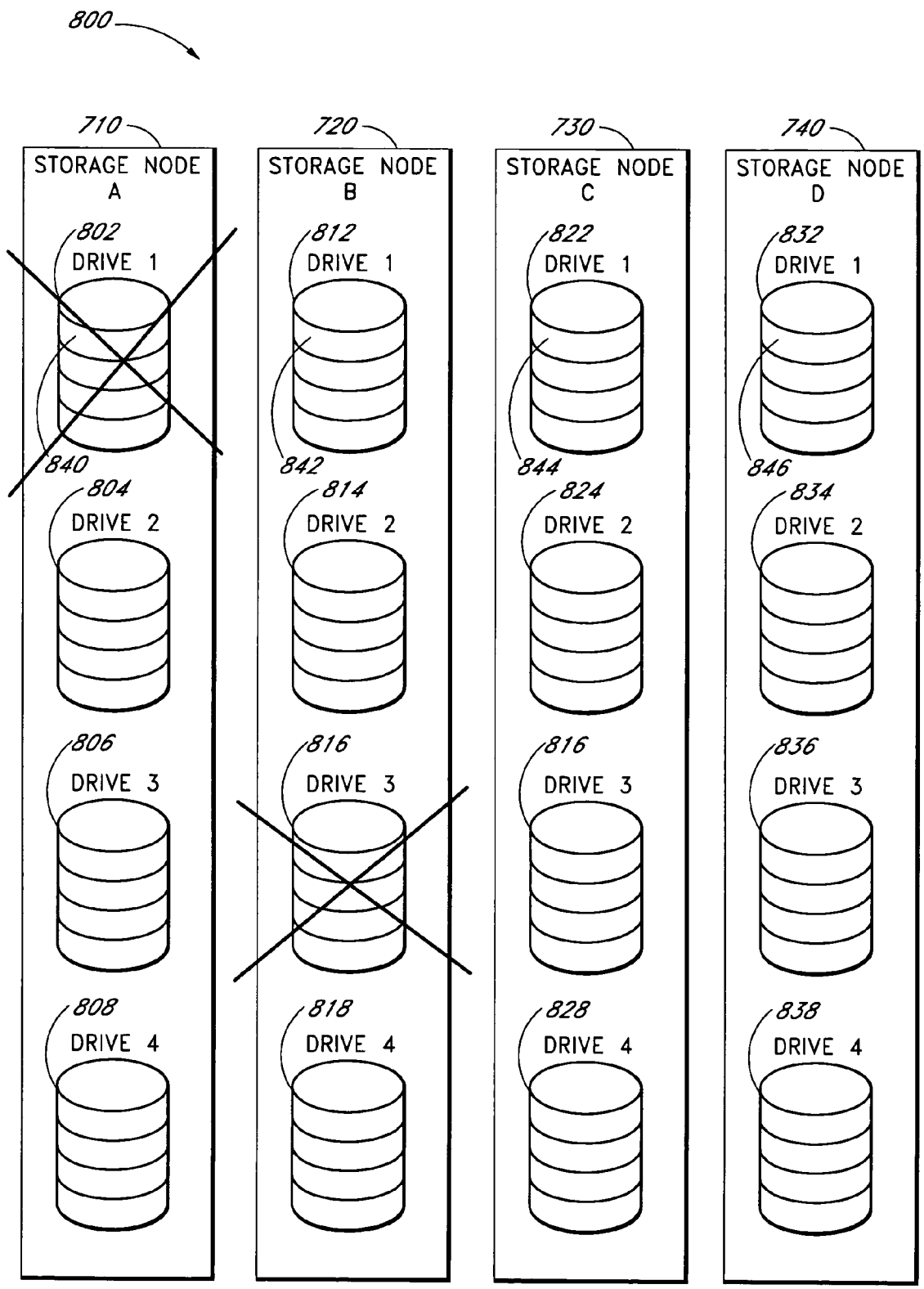
FIG. 8B illustrates one embodiment of data stored in storage nodes in one embodiment of a distributed system wherein two storage drives are unavailable.

FIG. 8B illustrates one embodiment of data stored on storage drives and storage nodes in one embodiment of a distributed system wherein two storage drives are unavailable. If the storage system determines that device 816 is unavailable, one or more of the data blocks on the unavailable device 816 can be moved to other devices that have available storage space, such as, for example, if the distributed system 800 receives a write request to write data on an unavailable device 816. In one embodiment, the distributed system 800 is a distributed file system where the metadata inode and the data sets are files.

A. Embodiments of Mapping Structures

Figure 9:
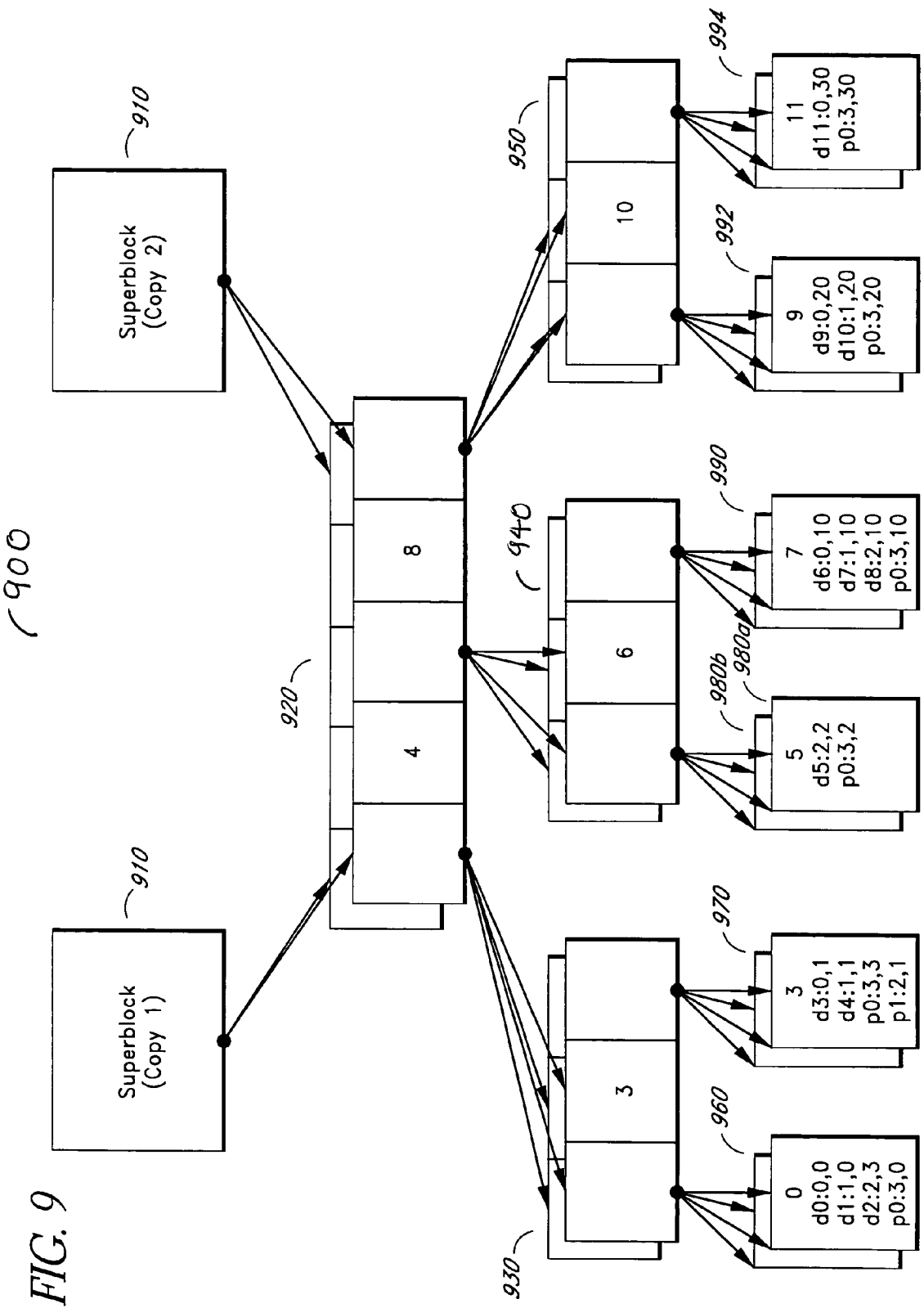
FIG. 9 illustrates one embodiment of a map data structure for storing locations of file data.

FIG. 9 illustrates one embodiment of a map structure 900 used to store location data about data sets stored on one or more storage devices. The map structure 900 stores the location of the data blocks of the data set and data protection blocks of the data set. For example, nodes 960 store data indicating the location of the first stripe of data from FIG. 2E. The first stripe of data includes d0, d1, d2, and p0(d0−d2). In this embodiment, the data is indexed in a b-tree map structure 900 using the offset into the data set of the first block in the stripe. It is recognized, however, that a variety of map structures 900 may be used and/or different map structures 900 may be used for data protection and data. Node 970 stores the locations of the second stripe of data. The second stripe of data includes d3, d4, p0(d3−d4), and p1(d3−d4). Node 980 stores the locations of the third stripe of data. The third stripe of data includes d5 and p0(d5). The leaf nodes 960, 970, 980, 990, 992, 994 store data indicating the location of the data stripes. The leaf nodes 960, 970, 980, 990, 992, 994 are associated with parent nodes 930, 940 950. The parent nodes 930, 940, 950 are associated with a root node 920. In the exemplary map structure 900, all copies of the superblocks related to the data set reference the root nodes 920 of the map structure 900.

In one embodiment, when a read or write request is received by the storage system, the map structure 900 is traversed in order to find the location of the requested data. For example, as indicated in leaf node 980, the data block d5 is stored on Drive 2, location 2 and the related parity data, p0 is stored on Drive 3, location 2. Thus, when the storage system receives a request for the data, the map structure 900 is traversed beginning at superblock 910, continuing to root node 920 and to node 940, and ending at node 980 where the location data for d5 is located. More particularly, the node 940 comprises an entry, 6, which may be referred to as a key. If the requested data is less than 6, the location data is stored off of the first branch of the node, for example, node 980; if the requested data is greater than or equal to 6, then the location data is stored off of the right branch of node 940. A similar process is performed in order to traverse from one of nodes 920 or 940 to one of the leaf nodes.

If the storage device storing the data for d5 is unavailable, the data blocks stored on the unavailable storage device may be migrated to another storage device. When this occurs, the map structure 900 is updated to indicate the new location of the data blocks in order to allow the data blocks to be accessed. In addition, if the device storing the data for node 980b, for example, is unavailable, a copy of node 980b is made and stored on an available node, and the same goes for the nodes 940 and 920. Systems and methods for traversing the map structure to check to see whether the nodes are available are disclosed in U.S. patent application Ser. No. 11/262,308 and U.S. Provisional Application Nos. 60/623,846 and 60/628,527 referenced below.

In one embodiment, the map structure 900 is a file map structure that stores the locations of the file data and the parity data of a file. The superblocks are the inodes for the file.

Figure 10:
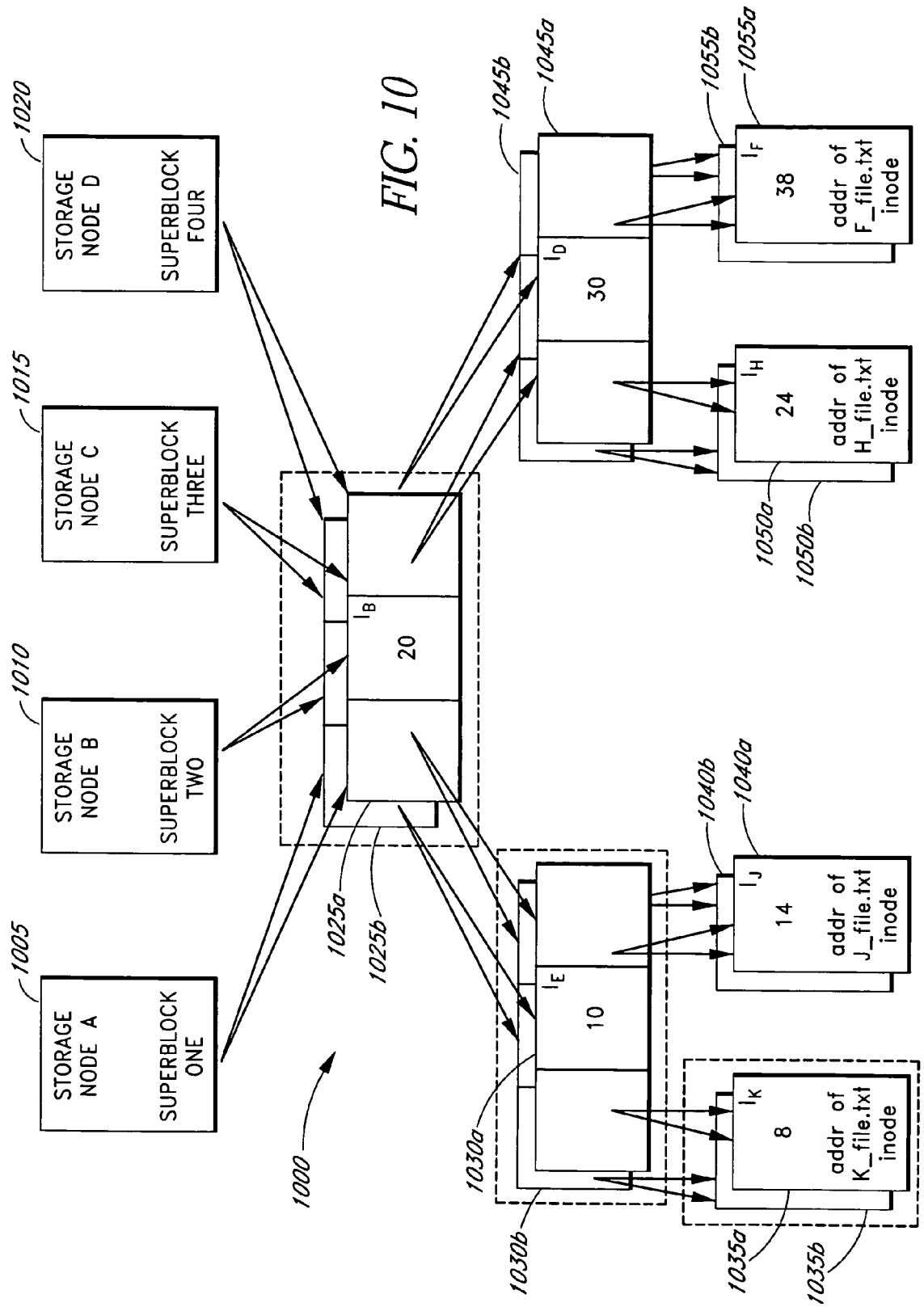
FIG. 10 illustrates one embodiment of a map data structure for storing data regarding file metadata.

FIG. 10 illustrates one embodiment of a map structure 1000 used to store data on a distributed file system. More particularly, the map structure 1000 illustrates nodes that may be used in an index tree that maps the locations of inodes on a distributed file system using the unique identifier of the inodes, also referred to as a LIN tree. For example, metadata nodes 1035, 1040, 1050, and 1055 store data indicating the location of the file index, or inode, corresponding to the particular .txt files noted in the Figure. As illustrated in FIG. 10, the leaf nodes 1035, 1040 are associated with a parent node 1030 and the leaf nodes 1050, 1055 are associated with a parent node 1045. Each of the parent nodes 1030, 1045 are associated with a root node 1025. In the exemplary map structure 1000, four superblocks 1005, 1010, 1015, 1020, are illustrated, where each superblock may be stored on a different node in a storage system. The superblocks each include references to each copy of the root node 1025 that may be stored on multiple devices. In one embodiment, multiple copies of each node are stored on various devices of a distributed storage system. U.S. patent application Ser. No. 11/255,818 entitled "Systems and Methods for Maintaining Distributed Data," filed Oct. 21, 2005, which is hereby incorporated by reference in its entirety, describes additional exemplary methods of map of data and directory information in a file system.

In one embodiment, in operation, when a read or write request is received by the storage system, the index structure is traversed in order to find the metadata node for the requested file. For example, as indicated in leaf node 1035, the file "K_file.txt" has an index of 8. Thus, when the storage system receives a request for the file associated with an index of 8, the map structure 1000 is traversed, beginning at a superblock 1005, 1010, 1015, 1020, continuing to node 1025, then continuing to node 1030, and ending at node 1035, where the metadata node for the file associated with index 8 is located. More particularly, the node 1025 comprises an entry, 20, which may be referred to as a key. If the requested file's index is less than or equal to 20, the files inode location is stored off of the first branch of the node, for example, node 1030; if the requested file's index is greater than 20, then the file's inode location is stored off of the second branch of the tree, for example, node 1045. A similar process is performed in order to traverse from one of nodes 1030 or 1045 to one of the leaf nodes comprising the location of the files inode.

Similar to the discussion above, if any of the nodes, including parent nodes, root nodes and superblocks, are stored on an unavailable device, references to the nodes on the unavailable devices should be updated to point to the new location of the index data previously stored on the unavailable nodes.

The embodiment of FIG. 10 illustrates a scenario when the metadata node device storing leaf node 1035a, node 1030 and an inode 1025a are unavailable. Thus, when one of the inode files for the file "K_file.txt" is moved to another device, metadata nodes 1035a and 1035b are updated to reflect the new location of the inode file. The system may then determine that one of the metadata files, for example, node 1035a, is stored on an unavailable device, and so metadata node 1035b is copied to become new node 1035a and new node 1035a is stored on an extant device. The system then updates the nodes 1030a and 1030b to reference the newly stored node 1035a. The system may then determine that node 1030a is stored on an unavailable device, and so node 1030b is copied to become new node 1030a, and new node 1030a is stored on an extant device. The system then updates nodes 1025a and 1025b to reference the newly stored 1030a. Because nodes 1025a and 1025b are on available devices, no additional updating is needed. Accordingly, nodes 1135a, 1130a, 1130b, 1125a, and 1125b are updated (as indicated by the dotted lines).

In one embodiment, more than one copy of each index and leaf node is stored in the distributed file system so that if one of the devices fails, the index data will still be available. In one embodiment, the distributed file system uses a process that restores copies of the index and leaf nodes of the map data structures 900, 1000 if one of the copies is stored on an unavailable device.

As used herein, data structures are collections of associated data elements, such as a group or set of variables or parameters. In one embodiment a structure may be implemented as a C-language "struct." One skilled in the art will appreciate that many suitable data structures may be used.

Embodiments of systems and methods for restoring metadata and data that is stored on nodes or drives that are unavailable and for updating the map data structure are disclosed in U.S. patent application Ser. No. 11/255,337, entitled "Systems And Methods For Accessing And Updating Distributed Data," filed on Oct. 21, 2005, U.S. patent application Ser. No. 11/262,308, entitled "Distributed System With Asynchronous Execution Systems And Methods," filed on Oct. 28, 2005, which claims priority to U.S. Provisional Appl. No. 60/623,846, entitled "Distributed System With Asynchronous Execution Systems And Methods," filed on Oct. 29, 2004, and U.S. Provisional Appl. No. 60/628,527, entitled "Distributed System With Asynchronous Execution Systems And Methods," filed on Nov. 15, 2004, and Patent Appl. No. 10/714,326, entitled "Systems and Methods for Restriping Files In A Distributed System," filed on Nov. 14, 2003, which claims priority to U.S. Provisional Appl. No. 60/426,464, entitled "Systems and Methods for Restriping Files In A Distributed System," filed on Nov. 14, 2002, all of which are hereby incorporated herein by reference in their entirety.

B. Group Management Protocol

In some embodiments, a group management protocol ("GMP") is used to maintain a view of the nodes and/or drives available to the distributed file system. The GMP communicates which storage devices, for example, storage nodes and storage drives, are available to the storage system, their current operational state (for example, available, unavailable, up, down, dead) and how much space is available on the each device. The GMP sends a notification when a storage devices is unavailable, when it becomes available again, and/or when it becomes is permanently unavailable. The storage system uses information from the GMP to determine which storage devices are available for reading and writing after receiving a read or write request.

On embodiment of a set of pseudocode for a GMP is set forth as follows:

```
If (receive an error from the drive on a write) {
   Send notice that drive is about to go down
   Mark drive as down on the participant side
   Execute a GMP transaction to inform the rest of the cluster the drive
      is down
         Broadcast that we want to bring drive down (GMP prepare
            message)
         Receive an OK from all nodes (GMP prepared message)
         Broadcast that they should take the drive down (GMP
            commit message)
         Each initiator updates their map that the drive is down
}
```

While the above pseudocode represents one embodiment of an implementation of a GMP, it is recognized that the GMP may be implemented in a variety of ways and is not limited to the exemplary embodiment above. Moreover the GMP may be used in conjunction with other protocols for coordinating activities among multiple nodes and/or systems. Embodiments of a protocol for coordinating activities among nodes are disclosed in U.S. patent application Ser. No. 11/262,306, entitled "Non-Blocking Commit Protocol Systems And Methods," filed Oct. 28, 2005, which claims priority to U.S. Provisional Appl. No. 60/623,843, entitled "Non-Blocking Commit Protocol Systems And Methods," filed Oct. 29, 2004, and U.S. patent application Ser. No. 11/449,153, entitled "Non-Blocking Commit Protocol Systems And Methods," filed Jun. 8, 2006, all of which are hereby incorporated herein by reference in their entirety.

Some of the figures and descriptions relate to an embodiment of the invention wherein the environment is that of a distributed file system, the present invention is not limited by the type of environment in which the systems and methods are used, however, and the systems and methods may be used in other environments, such as, for example, other file systems, other distributed systems, non-distributed systems, the Internet, the World Wide Web, a private network for a hospital, a broadcast network for a government agency, an internal network of a corporate enterprise, an intranet, a local area network, a wide area network, a wired network, a wireless network, a system area network, and so forth. It is also recognized that in other embodiments, the systems and methods described herein may be implemented as a single module and/or implemented in conjunction with a variety of other modules and the like.

VIII. Other Embodiments

While certain embodiments of the invention have been described, these embodiments have been presented by way of example only, and are not intended to limit the scope of the present invention. The above-mentioned alternatives are examples of other embodiments, and they d0 not limit the scope of the invention. It is recognized that a variety of data structures with various fields and data sets may be used. In addition, other embodiments of the flow charts may be used.

It is also recognized that the term "remote" may include data, objects, devices, components, and/or modules not stored locally, that are or are not accessible via the local bus or data stored locally and that is "virtually remote." Thus, remote data may include a device which is physically stored in the same room and connected to the user's device via a network. In other situations, a remote device may also be located in a separate geographic area, such as, for example, in a different location, country, and so forth.

Moreover, while the description details certain embodiments of the invention, it will be appreciated that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A storage system for managing unavailable storage devices comprising:
   a plurality of storage devices comprising at least a first storage device and a second storage device;
   one or more computer processors, each of the one or more computer processors in electronic communication with one or more of the plurality of storages devices; and
   at least one executable software module executed by the one or more computer processors, wherein the executable software module is configured to reconstruct data on an unavailable device on a read request, wherein the read request does not result in the executable software module copying the reconstructed data to an alternate available device, and wherein the executable software module is configured to:
      store a set of data on the plurality of storage devices, wherein the set of data comprises a plurality of blocks, and wherein storing the set of data comprises storing at least a first block and a second block on the first storage device;
      determine that the first storage device is unavailable;
      receive a read request corresponding to the first block on the first storage device;
      in response to the read request, reconstruct the first block using one or more other blocks in the plurality of blocks, wherein the read request does not trigger modifying an association between the first block and the first storage device in metadata based on a future availability of the first storage device after a period of temporary unavailability;
      return the reconstructed data block;
      receive a write request comprising a request to write an updated block corresponding to the second block;
      in response to the write request,
         store the updated block on a second storage device in the plurality of storage devices, the second storage device different from the first storage device, and
         modify an association between the second block and the first storage device in metadata to reflect an association between the second block and the second storage device,
      determine that the first storage device is available after a period of unavailability; and
      in response to determining that the first storage device is available, free the second block on the first storage device.

2. The storage system of claim 1, wherein the storage system is a file system.

3. The storage system of claim 2, wherein the file system is a distributed file system.

4. The storage system of claim 1, wherein the at least one executable software module is further configured to, in response to the write request, store the updated block in a journal.

5. The storage system of claim 4, wherein the at least one executable software module is further configured to flush the updated block from the journal to the first storage device when the first storage device is available.

6. The storage system of claim 1, wherein the set of data comprises a plurality of blocks of data and at least one of the first block and the second block comprises a parity block.

7. The storage system of claim 1, wherein the set of data comprises mirrored data, and the first block comprises a mirror of a third block in the set of data.

8. The storage system of claim 1, wherein storing the set of data on the plurality of storage devices comprises storing the set of data on a subset of storage devices of the plurality of storage devices, and wherein the subset of storage devices comprises less than all the storage devices in the plurality of storage devices.

9. The storage system of claim 8, wherein storing the set of data on the subset of storage devices of the plurality of storage devices comprises storing at least one block of data on each storage device in the subset of storage devices.

10. The storage system of claim 9, wherein the second storage device in the plurality of storage devices is a member of the subset of storage devices.

11. The storage system of claim 9, wherein the second storage device in the plurality of storage devices is not a member of the subset of storage devices.

12. The storage system of claim 1, wherein the at least one executable software module is further configured to store the set of data on the plurality of storage devices based on a parity protection plan.

13. The storage system of claim 12, wherein storing the updated block on the second storage device in the plurality of storage devices satisfies the parity protection plan.

14. The storage system of claim 12, wherein storing the updated block on the second storage device in the plurality of storage devices does not satisfy the parity protection plan.

15. The storage system of claim 1, wherein at least one executable software module is further configured to store a second set of data on the plurality of storage devices, wherein the second set of data comprises a second plurality of blocks, and wherein storing the second set of data comprises storing at least a third block on the first storage device and a fourth block on the second storage device.

16. The storage system of claim 1, wherein the set of data comprises a second set of metadata.

17. The storage system of claim 16, wherein the second set of metadata comprises at least a mirrored copy of the first set of metadata.

* * * * *

UNITED STATES PATENT AND TRADEMARK OFFICE
CERTIFICATE OF CORRECTION

PATENT NO. : 8,286,029 B2  
APPLICATION NO. : 11/643725  
DATED : October 9, 2012  
INVENTOR(S) : Anderson et al.

Page 1 of 1

It is certified that error appears in the above-identified patent and that said Letters Patent is hereby corrected as shown below:

On the Title Page

In column 2 (page 4 item 56) at line 71, Under Other Publications, change "Plateform" to --Platform--.

In column 1 (page 5 item 56) at line 7, Under Other Publications, change "MSCE" to --MCSE--.

In column 1 (page 6 item 56) at line 8, Under Other Publications, change "Palto" to --Palo--.

In the Specifications

In column 5 at line 38 (approx.), After "and" insert --U.S. patent application--.

In column 7 at line 8, Change "disks" to --disk,--.

In column 8 at line 30-31 (approx.), Change "d0 not" to --do not--.

In column 10 at line 26 (approx.), Change "psuedocode" to --pseudocode--.

In column 11 at line 9 (approx.), Change "psuedocode" to --pseudocode--.

In column 11 at line 56, Change "d0 not" to --do not--.

In column 15 at line 55, Change "d0 not" to --do not--.

In the Claims

In column 16 at line 20, In Claim 1, change "storages" to --storage--.

Signed and Sealed this  
Fourteenth Day of May, 2013

Teresa Stanek Rea  
*Acting Director of the United States Patent and Trademark Office*